(12) United States Patent
Kamiya

(10) Patent No.: US 12,450,500 B2
(45) Date of Patent: Oct. 21, 2025

(54) COMMUNICATION SYSTEM, TRANSMISSION APPARATUS, RECEPTION APPARATUS, MATRIX GENERATION APPARATUS, COMMUNICATION METHOD, TRANSMISSION METHOD, RECEPTION METHOD, MATRIX GENERATION METHOD AND RECORDING MEDIUM

(71) Applicant: NEC Corporation, Tokyo (JP)

(72) Inventor: Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 639 days.

(21) Appl. No.: 17/796,714

(22) PCT Filed: Feb. 17, 2020

(86) PCT No.: PCT/JP2020/006133
§ 371 (c)(1),
(2) Date: Aug. 1, 2022

(87) PCT Pub. No.: WO2021/166053
PCT Pub. Date: Aug. 26, 2021

(65) Prior Publication Data
US 2023/0063344 A1 Mar. 2, 2023

(51) Int. Cl.
*G06N 5/04* (2023.01)
*G06N 3/02* (2006.01)
(Continued)

(52) U.S. Cl.
CPC ............. *G06N 5/04* (2013.01); *G06N 3/02* (2013.01); *H03M 7/3066* (2013.01);
(Continued)

(58) Field of Classification Search
CPC .................................................. G06N 5/04
(Continued)

(56) References Cited

U.S. PATENT DOCUMENTS

| 4,972,473 | A | 11/1990 | Ejiri et al. |
| 10,778,245 | B1 * | 9/2020 | Ramesh ................. G06F 7/483 |

(Continued)

FOREIGN PATENT DOCUMENTS

| JP | S58-071788 A | 4/1983 |
| JP | H02-032679 A | 2/1990 |

(Continued)

OTHER PUBLICATIONS

International Search Report for PCT Application No. PCT/JP2020/006133, mailed on Jul. 7, 2020.
(Continued)

*Primary Examiner* — Ruay Ho
(74) *Attorney, Agent, or Firm* — Sughrue Mion, PLLC

(57) ABSTRACT

A communication system SYS includes a transmission apparatus 1 and a reception apparatus 2. The transmission apparatus includes: a conversion unit 111 for converting a bit stream Z having a bit length b into a bit stream Y that has w−1 (w is an integer equal to or larger than 2) bit 1 and that has a bit length n (n>b); a conversion unit 112 for converting the bit stream Y into a bit stream X having a bit length t (t<n); and a Neural Network 113 that has a t input node and that outputs a value relating to a feature of a transmission signal Tx when the bit stream X is inputted thereto. The reception apparatus includes: a Neural Network 212 that has a t output node and that outputs a numerical data stream U including t numerical data when a feature of the reception signal is inputted thereto; a conversion unit 213 for converting the numerical data stream U into a numerical data stream Y' including n numerical data; and a generation unit 214 for generating a bit stream Z' having the bit length b by performing, on the numerical data stream U, an inverse conversion of a conversion processing performed by the conversion unit 111.

18 Claims, 19 Drawing Sheets

(51) Int. Cl.
  *H03M 7/30* (2006.01)
  *H03M 7/40* (2006.01)
  *H04B 3/02* (2006.01)
(52) U.S. Cl.
  CPC ....... *H03M 7/4093* (2013.01); *H03M 7/6005* (2013.01); *H03M 7/6011* (2013.01); *H04B 3/02* (2013.01)
(58) Field of Classification Search
  USPC ............................... 706/15; 712/15; 341/118
  See application file for complete search history.

(56) References Cited

U.S. PATENT DOCUMENTS

| | | | |
|---|---|---|---|
| 2008/0082786 A1* | 4/2008 | Lovell | G06F 15/76 |
| | | | 712/15 |
| 2017/0126360 A1 | 5/2017 | Millar et al. | |
| 2017/0255225 A1* | 9/2017 | Lilja | G06T 1/00 |
| 2018/0204131 A1* | 7/2018 | Najafi | G06N 7/01 |
| 2019/0042513 A1* | 2/2019 | Fleming, Jr. | G06F 9/30145 |
| 2019/0121839 A1* | 4/2019 | Mohajer | G06F 7/58 |
| 2019/0149166 A1* | 5/2019 | Mohajer | H03M 13/2903 |
| | | | 341/118 |
| 2019/0251418 A1 | 8/2019 | Nakanishi et al. | |
| 2019/0266482 A1 | 8/2019 | Erez | |
| 2019/0289345 A1* | 9/2019 | Najafi | G06F 7/584 |
| 2020/0128307 A1* | 4/2020 | Li | H04N 19/119 |
| 2020/0177418 A1 | 6/2020 | Hoydis et al. | |
| 2020/0321982 A1 | 10/2020 | Kamiya | |
| 2020/0401376 A1* | 12/2020 | Najafi | G06F 7/70 |

FOREIGN PATENT DOCUMENTS

| | | | | |
|---|---|---|---|---|
| JP | 2018-518126 A | 7/2018 | | |
| JP | 2019-016967 A | 1/2019 | | |
| JP | 2019-140680 A | 8/2019 | | |
| WO | 2018/233932 A1 | 12/2018 | | |
| WO | 2019/080988 A1 | 5/2019 | | |
| WO | 2019/130475 A1 | 7/2019 | | |
| WO | WO-2019131880 A1 * | 7/2019 | ............ | G06N 3/045 |

OTHER PUBLICATIONS

Timothy O'Shea et al., "An Introduction to Deep Learning for the Physical Layer", IEEE Transactions on Cognitive Communications and Networking, vol. 3, No. 4, pp. 563 to 575, Dec. 2017.

Thomas G.Dietterich et al., "Solving Multiclass Learning Problems via Error-Correction Output Codes", Journal of Artificial Intelligence Research, vol. 2, pp. 263 to 286, 1995.

Huiqun Deng et al., "Applying Error-Correcting Output Coding to Enhance Convolutional Neural Network for Target Detection and Pattern Recognition", 2010 International Conference on Pattern Recognition, pp. 4291 to 4294, 2010.

W.H.Kautz et al., "Nonrandom Binary Superimposed Codes", IEEE Transactions on Information Theory, vol. 10, No. 4, pp. 363 to 377, 1964.

Huseyin A.Inan et al., "Sparse Combinatorial Group Testing", arXiv 1711.05403, Jan. 25, 2019.

* cited by examiner $M_{8,2} =$

FIG. 17

COMMUNICATION SYSTEM, TRANSMISSION APPARATUS, RECEPTION APPARATUS, MATRIX GENERATION APPARATUS, COMMUNICATION METHOD, TRANSMISSION METHOD, RECEPTION METHOD, MATRIX GENERATION METHOD AND RECORDING MEDIUM

This application is a National Stage Entry of PCT/JP2020/006133 filed on Feb. 17, 2020, the contents of all of which are incorporated herein by reference, in their entirety.

TECHNICAL FIELD

The present invention relates to a technical field of a communication system and a communication method that are configured to transmit and receive a signal through a communication line, a transmission apparatus and a transmission method that are configured to transmit a signal through a communication line, a reception apparatus and a reception method that are configured to receive a signal through a communication line, a matrix generation apparatus and a matrix generation method that are configured to generate a binary matrix, and a recording medium on which a computer program for executing each method described above is recorded.

BACKGROUND ART

A communication system using a Neural Network is known. For example, a Patent Literature 1 discloses a communication system that is configured to demodulate a reception signal by using a Neural Network. For example, a Patent Literature 2 discloses a communication system that is configured to transmit a transmission signal by using a Neural Network.

Additionally, there is a Patent Literature 3 and a non-Patent Literature 1 to a non-Patent Literature 5 as a background art document relating to the present invention.

CITATION LIST

Patent Literature

Patent Literature 1: JP2019-016967A
Patent Literature 2: JPH02-032679A (JP1990-032679A)
Patent Literature 3: WO2019/130475A1

Non-Patent Literature

Non-Patent Literature 1: Timothy O'Shea et al., "An Introduction to Deep Learning for the Physical Layer", IEEE Transactions on Cognitive Communications and Networking, Vol. 3, no. 4, pp. 563 to 575, December 2017
Non-Patent Literature 2: Thomas G. Dietterich et al., "Solving Multiclass Learning Problems via Error-Correction Output Codes", Journal of Artificial Intelligence Research, Vol. 2, pp. 263 to 286, 1995
Non-Patent Literature 3: Huiqun Deng et al., "Applying Error Correcting Output Coding to Enhance Convolutional Network for Target Detection and Pattern Recognition", 2010 International Conference on Pattern Recognition, pp. 4291 to 4294, 2010
Non-Patent Literature 4: W. H. Kautz et al., "Nonrandom Binary Superimposed Codes", IEEE Transactions on Information Theory, Vol. 10, No. 4, pp. 363 to 377, 1964
Non-Patent Literature 5: Huseyin A. Inan et al., "Sparse Combinatorial Group Testing", arXiv 1711.05403, Jan. 25, 2019

SUMMARY

Technical Problem

The communication system using the Neural Network has such a technical problem that a processing load (namely, a calculation load) is relatively large due to a complication of a network structure of the Neural Network. Thus, it is desirable to reduce the processing load of the communication system (namely, prevent an increase of the processing load).

As one example, when a reception apparatus that is configured to receive, as a reception signal, a transmission signal transmitted from a transmission apparatus through a communication line includes a Neural Network, the Neural Network may be used to infer, from the reception signal that is affected by a disturbance (for example, at least one of a noise, an interference and the like) in the communication line, a correct transmission signal that is not affected by the disturbance. Namely, the Neural Network may be used as a classifier that is configured to infer which of a plurality of signal patterns that can be represented by the transmission signal (namely, classes of the transmission signal, and they are equivalent to a plurality of bit array patterns that can be represented by a bit stream represented by the transmission signal) is similar to a signal pattern of the reception signal. In this case, the number of nodes of an output layer of the Neural Network is usually often same as (alternatively, proportional to) the number of the signal patterns that can be represented by the transmission signal. This is because the Neural Network typically outputs a probability that the signal pattern of the reception signal is the signal pattern that can be represented by the transmission signal, wherein the number of the outputted probabilities is equal to the number of the signal patterns that can be represented by the transmission signal. Thus, the number of the nodes of the output layer of the Neural Network increases as the number of the signal patterns that can be represented by the transmission signal increases. As a result, the processing load of the communication system increases as the number of the nodes of the output layer of the Neural Network increases. For example, when the transmission signal that represents bit stream including 8 bits is transmitted, the transmission signal can represents 256 ($=2^8$) types of signal patterns. When a 1024QAM (Quadrature Amplitude Modulation) or 4096QAM is used, the number of the signal patterns that can be represented by the transmission signal increases to be 1024 or 4096. Therefore, a reduction of the processing load is a large technical problem.

Incidentally, same technical problem occurs when the transmission apparatus that is configured to transmit the transmission signal through the communication line includes a Neural Network, although a detailed description is omitted for a simplification of the description.

It is an example object of the present invention to provide a communication system, a transmission apparatus, a reception apparatus, a matrix generation apparatus, a communication method, a transmission method, a reception method, a matrix method and a recording medium that are configured to solve the above described technical problem. As one example, it is an example object of the present invention to provide a communication system, a transmission apparatus, a reception apparatus, a matrix generation apparatus, a communication method, a transmission method, a reception method, a matrix method and a recording medium in which a necessary processing load is relatively small.

Solution to Problem

One example aspect of a communication system is a communication system including:

a transmission apparatus that is configured to transmit a transmission signal through a communication line; and a reception apparatus that is configured to receive, as a reception signal, the transmission signal transmitted by the transmission apparatus through the communication line, wherein the transmission apparatus includes: a first bit conversion unit that is configured to convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; a second bit conversion unit that is configured to convert the second bit stream into a third bit stream having a third bit length t that is shorter than the second bit stream n; and a Neural Network that has an input node the number of which is equal to the third bit length t and that is configured to output an index value designating a feature of the transmission signal when the third bit stream is inputted thereto, the reception apparatus includes: a Neural Network that has an output node the number of which is equal to the third bit length t and that is configured to output a first numerical data stream including numerical data the number of which is equal to the third bit length t when a feature of the reception signal is inputted thereto; a numerical conversion unit that is configured to convert the first numerical data stream into a second numerical data stream including numerical data the number of which is equal to the second bit length n; and a generation unit that is configured to generate a fourth bit stream having the first bit length b by performing, on the second numerical data stream, a conversion processing that corresponds to an inverse conversion of a conversion processing performed by the first bit conversion unit.

One example aspect of a transmission apparatus is a transmission apparatus that is configured to transmit a transmission signal through a communication line, wherein the transmission apparatus includes: a first bit conversion unit that is configured to convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; a second bit conversion unit that is configured to convert the second bit stream into a third bit stream having a third bit length t that is shorter than the second bit stream n; and a Neural Network that has an input node the number of which is equal to the third bit length t and that is configured to output an index value designating a feature of the transmission signal when the third bit stream is inputted thereto.

One example aspect of a reception apparatus is a reception apparatus that is configured to receive, as a reception signal, a transmission signal transmitted by a transmission apparatus through a communication line, wherein the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream, the reception apparatus includes: a Neural Network that has an output node the number of which is equal to the third bit length t and that is configured to output a first numerical data stream including numerical data the number of which is equal to the third bit length t when a feature of the reception signal is inputted thereto; a numerical conversion unit that is configured to convert the first numerical data stream into a second numerical data stream including numerical data the number of which is equal to the second bit length n; and a generation unit that is configured to generate a fourth bit stream having the first bit length b by performing, on the second numerical data stream, a conversion processing that corresponds to an inverse conversion of a conversion processing for converting the first bit stream into the second bit stream.

One example aspect of a matrix generation apparatus is a binary matrix generation apparatus that is configured to generate a binary matrix, wherein the binary matrix generation apparatus is configured to: generate q+w (wherein, w is an integer that is equal to or larger than 2) number of first matrixes each of which has one element that is 1 in each column vector and each of which has a size of q (wherein, q is an exponentiation of a prime number) number of row×(q−1) number of column; generate a second matrix that has q+w number of the first matrixes as elements and that has a size of wq number of row×(q²−1) number of column; and set, as the binary matrix, a third matrix that is obtained by adding a column vector having w number of elements that are 1 into the second matrix.

One example aspect of a communication method is a communication method using a transmission apparatus that is configured to transmit a transmission signal through a communication line and reception apparatus that is configured to receive, as a reception signal, the transmission signal transmitted by the transmission apparatus through the communication line, wherein the communication method includes: converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; converting the second bit stream into a third bit stream having a third bit length t that is shorter than the second bit stream n; generating the transmission signal by using a Neural Network that has an input node the number of which is equal to the third bit length t and that is configured to output an index value designating a feature of the transmission signal when the third bit stream is inputted thereto; inputting the reception signal into a Neural Network that has an output node the number of which is equal to the third bit length t and that is configured to output a first numerical data stream including numerical data the number of which is equal to the third bit length t when a feature of the reception signal is inputted thereto; converting the first numerical data stream into a second numerical data stream including numerical data the number of which is equal to the second bit length n; and generating a fourth bit stream having the first bit length b by performing, on the second numerical data stream, a conversion processing that corresponds to an inverse conversion of a conversion processing performed by the first bit conversion unit.

One example aspect of a transmission method is a transmission method of transmitting a transmission signal through a communication line, wherein the transmission method includes: converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; converting the second bit stream into a third bit stream having a third bit length t that is shorter than the second bit stream n; and generating the transmission signal by using a Neural Network that has an input node the number of which is equal to the third bit length t and that is configured to output an index value designating a feature of the transmission signal when the third bit stream is inputted thereto.

One example aspect of a reception method is a reception method of receiving, as a reception signal, a transmission signal transmitted by a transmission apparatus through a communication line, wherein the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream, the reception method includes: inputting the reception signal into a Neural Network that has an output node the number of which is equal to the third bit length t and that is configured to output a first numerical data stream including numerical data the number of which is equal to the third bit length t when a feature of the reception signal is inputted thereto; converting the first numerical data stream into a second numerical data stream including numerical data the number of which is equal to the second bit length n; and generating a fourth bit stream having the first bit length b by performing, on the second numerical data stream, a conversion processing that corresponds to an inverse conversion of a conversion processing for converting the first bit stream into the second bit stream.

One example aspect of a matrix generation method is a binary matrix generation method of generating a binary matrix, wherein the binary matrix generation method includes: generating q+w (wherein, w is an integer that is equal to or larger than 2) number of first matrixes each of which has one element that is 1 in each column vector and each of which has a size of q (wherein, q is an exponentiation of a prime number) number of row×(q−1) number of column; generating a second matrix that has q+w number of the first matrixes as elements and that has a size of wq number of row×(q²−1) number of column; and setting, as the binary matrix, a third matrix that is obtained by adding a column vector having w number of elements that are 1 into the second matrix.

A first example aspect of a recording medium is a recording medium on which a computer program that allows a computer to execute a communication method using a transmission apparatus that is configured to transmit a transmission signal through a communication line and reception apparatus that is configured to receive, as a reception signal, the transmission signal transmitted by the transmission apparatus through the communication line is recorded, wherein the communication method includes: converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; converting the second bit stream into a third bit stream having a third bit length t that is shorter than the second bit stream n; generating the transmission signal by using a Neural Network that has an input node the number of which is equal to the third bit length t and that is configured to output an index value designating a feature of the transmission signal when the third bit stream is inputted thereto; inputting the reception signal into a Neural Network that has an output node the number of which is equal to the third bit length t and that is configured to output a first numerical data stream including numerical data the number of which is equal to the third bit length t when a feature of the reception signal is inputted thereto; converting the first numerical data stream into a second numerical data stream including numerical data the number of which is equal to the second bit length n; and generating a fourth bit stream having the first bit length b by performing, on the second numerical data stream, a conversion processing that corresponds to an inverse conversion of a conversion processing performed by the first bit conversion unit.

A second example aspect of a recording medium is a recording medium on which a computer program that allows a computer to execute a transmission method of transmitting a transmission signal through a communication line is recorded, wherein the transmission method includes: converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; converting the second bit stream into a third bit stream having a third bit length t that is shorter than the second bit stream n; and generating the transmission signal by using a Neural Network that has an input node the number of which is equal to the third bit length t and that is configured to output an index value designating a feature of the transmission signal when the third bit stream is inputted thereto.

A third example aspect of a recording medium is a recording medium on which a computer program that allows a computer to execute a reception method of receiving, as a reception signal, a transmission signal transmitted by a transmission apparatus through a communication line is recorded, wherein the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream, the reception method includes: inputting the reception signal into a Neural Network that has an output node the number of which is equal to the third bit length t and that is configured to output a first numerical data stream including numerical data the number of which is equal to the third bit length t when a feature of the reception signal is inputted thereto; converting the first numerical data stream into a second numerical data stream including numerical data the number of which is equal to the second bit length n; and generating a fourth bit stream having the first bit length b by performing, on the second numerical data stream, a conversion processing that corresponds to an inverse conversion of a conversion processing for converting the first bit stream into the second bit stream.

A fourth example aspect of a recording medium is a recording medium on which a computer program that allows a computer to execute a binary matrix generation method of generating a binary matrix is recorded, wherein the binary matrix generation method includes: generating q+w (wherein, w is an integer that is equal to or larger than 2) number of first matrixes each of which has one element that is 1 in each column vector and each of which has a size of q (wherein, q is an exponentiation of a prime number) number of row×(q−1) number of column; generating a second matrix that has q+w number of the first matrixes as elements and that has a size of wq number of row×(q²−1) number of column; and setting, as the binary matrix, a third matrix that is obtained by adding a column vector having w number of elements that are 1 into the second matrix.

Effect

According to one example aspect of each of the communication system, the transmission apparatus, the reception apparatus, the matrix generation apparatus, the communication method, the transmission method, the reception method, the matrix method and the recording medium described above, a necessary processing load is relatively small.

BRIEF DESCRIPTION OF DRAWINGS

FIG. 17 illustrates one example of the binary matrix.

DESCRIPTION OF EXAMPLE EMBODIMENTS

Next, an example embodiment of a communication system, a transmission apparatus, a reception apparatus, a matrix generation apparatus, a communication method, a transmission method, a reception method, a matrix method and a recording medium will be described with reference to the drawings. Note that the present invention is not limited to the example embodiment described below.

<1> Communication System SYS

Firstly, a communication system SYS in the present example embodiment will be described.

<1-1> Configuration of Communication System SYS

Figure 1:
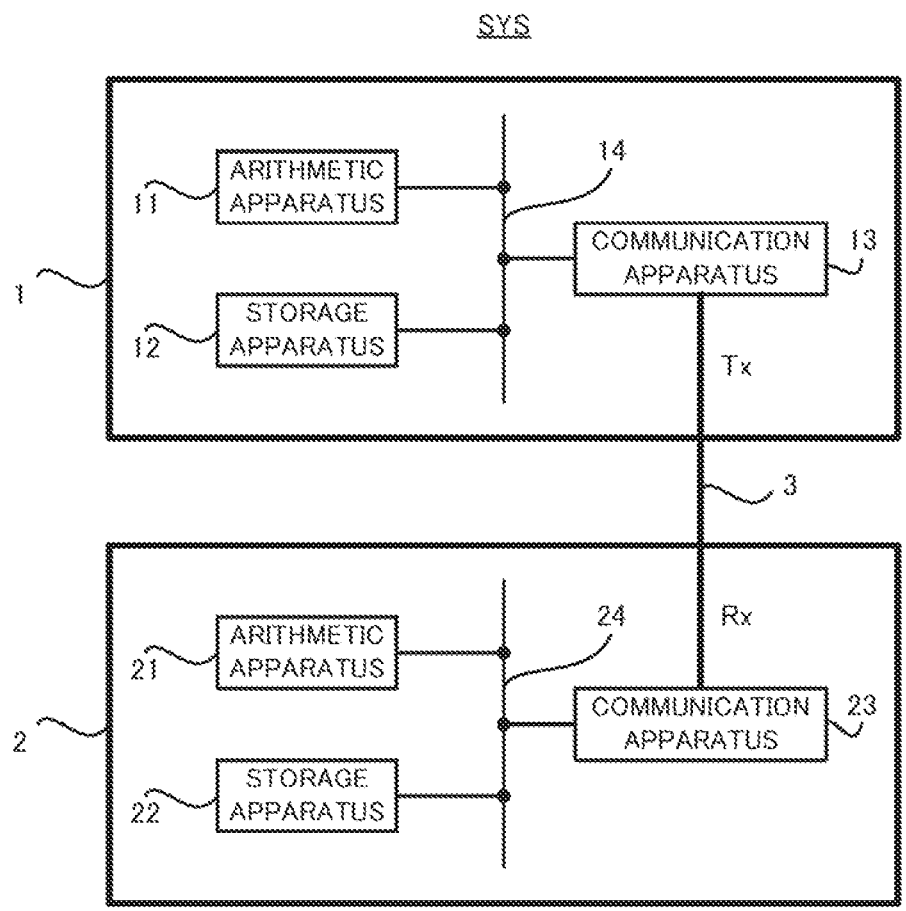
FIG. 1 is a block diagram that illustrates a configuration of a communication system in a present example embodiment.

Firstly, with reference to FIG. 1, a configuration of the communication system SYS in the present example embodiment will be described. FIG. 1 is a block diagram that illustrates the configuration of the communication system SYS in the present example embodiment.

As illustrated in FIG. 1, the communication system SYS includes a transmission apparatus 1 and a reception apparatus 2. The transmission apparatus 1 is configured to transmit a transmission signal Tx into the reception apparatus 2 through a communication line 3. The reception apparatus 2 is configured to receive, as a reception signal Rx, the transmission signal Tx transmitted by the transmission apparatus 1 through the communication line 3. The communication line 3 may include a wired communication line (namely, a communication network). The communication line 3 may include a wireless communication line (namely, a communication network).

The transmission apparatus 1 includes an arithmetic apparatus 11, a storage apparatus 12 and a communication apparatus 13. The arithmetic apparatus 11, the storage apparatus 12 and the communication apparatus 13 may be interconnected through a data bus 14.

The arithmetic apparatus 11 may include at least one of a CPU (Central Processing Unit), a GPU (Graphical Processing Unit) and a FPGA (Field Programmable Gate Array). The arithmetic apparatus 11 reads a computer program. For example, the arithmetic apparatus 11 may read a computer program stored in the storage apparatus 12. For example, the arithmetic apparatus 11 may read a computer program stored in a computer-readable recording medium, by using a not-illustrated recording medium reading apparatus. The arithmetic apparatus 11 may obtain (namely, download or read) a computer program from a not-illustrated apparatus placed outside the transmission apparatus 1 through the communication apparatus 13. The arithmetic apparatus 11 executes the read computer program. As a result, a logical functional block for performing an operation that should be performed by the transmission apparatus 1 is implemented in the arithmetic apparatus 11. Specifically, a logical functional block for performing a transmission operation for transmitting the transmission signal Tx is implemented in the arithmetic apparatus 11. Namely, the arithmetic apparatus 11 is configured to serve as a controller for implementing the logical block for performing the operation that should be performed by the transmission apparatus 1.

Figure 2:
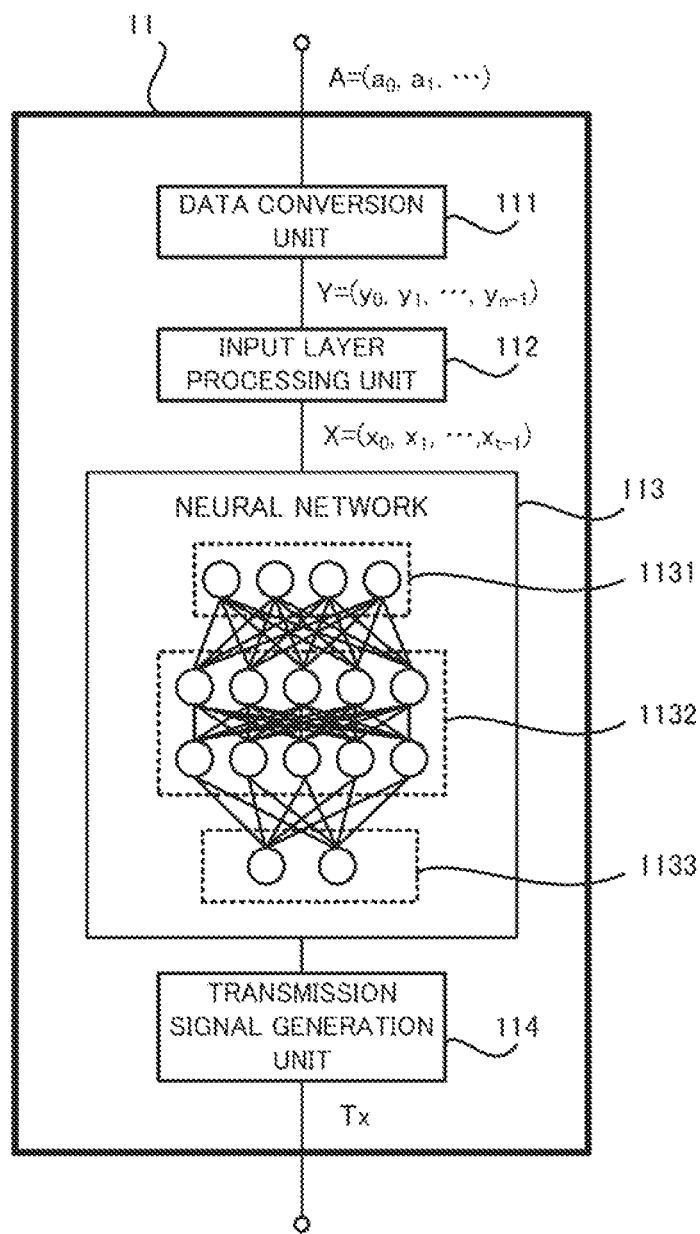
FIG. 2 is a block diagram that illustrates a configuration of logical functional blocks implemented in an arithmetic apparatus of a transmission apparatus in the present example embodiment.

FIG. 2 illustrates one example of the logical functional block that is implemented in the arithmetic apparatus 11 for performing the transmission operation. As illustrated in FIG. 2, a data conversion unit 111 that is one specific example of a "first bit conversion unit", an input layer processing unit 112 that is one specific example of a "second bit conversion unit", a Neural Network 113 and a transmission signal generation unit 114 are implemented in the arithmetic apparatus 11. The Neural Network 113 includes an input layer 1131, a hidden layer 1132 and an output layer 1133. Note that a detail of an operation of each of the data conversion unit 111, the input layer processing unit 112, the Neural Network 113 and the transmission signal generation unit 114 will be described later in detail with reference to FIG. 4 and so on, however, an overview thereof will be briefly described here. The data conversion unit 111 is configured to divide a bit stream $A=(a_0, a_1, \ldots)$ that is time-series bit data representing digital transmission data that should be transmitted by the transmission apparatus 1 by a unit of a bit stream $Z=(z_0, z_1, \ldots, z_{b-1})$ a bit length of which is b (note that b is an integer that is equal to or larger than 1). Furthermore, the data conversion unit 111 is configured to convert the bit stream Z into a bit stream $Y=(y_0, y_1, \ldots, y_{n-1})$ a bit length of which is n (note that n is an integer that is equal to or larger than 1), wherein w−1 (note that w is an integer that is equal to or larger than 2) number of bit 1 is assigned at a bit position based on a bit array pattern (namely, a class) of the bit stream Z in the bit stream Y. The input layer processing unit 112 is configured to convert the bit stream $Y=(y_0, y_1, \ldots, y_{n-1})$ into a bit stream $X=(x_0, x_1, \ldots, x_{t-1})$ a bit length of which is t (note that t is an integer that is smaller than n and larger than w). The Neural Network 113 includes input nodes (namely, nodes included in the input layer 1131) the number of which is equal to the bit length t of the bit stream X. The Neural Network 113 is configured to input an index value designating a feature of the transmission signal Tx. The transmission signal generation unit 114 is configured to generate the transmission signal Tx based on an output of the Neural Network 113 (namely, an output of the output layer 1133).

Again in FIG. 1, the storage apparatus 12 is configured to store desired data. For example, the storage apparatus 12 may temporarily store the computer program that is executed by the arithmetic apparatus 11. The storage apparatus 12 may temporarily store data temporarily used by the arithmetic apparatus 11 when the arithmetic apparatus 11 executes the computer program. The storage apparatus 12 may store data stored for a long term by the transmission apparatus 1. Note that the storage apparatus 12 may include at least one of a RAM (Random Access Memory), a ROM (Read Only Memory), a hard disk apparatus, a magneto-optical disc, a SSD (Solid State Drive) and a disk array apparatus.

The communication apparatus 13 is configured to communicate with the reception apparatus 2 through the communication line 3. In the present example embodiment, the communication apparatus 13 is configured to transmit the transmission signal Tx generated by the arithmetic apparatus 11 into the reception apparatus 2 through the communication line 3.

The reception apparatus 2 includes an arithmetic apparatus 21, a storage apparatus 22 and a communication apparatus 23. The arithmetic apparatus 21, the storage apparatus 22 and the communication apparatus 23 may be interconnected through a data bus 24.

The arithmetic apparatus 21 may include at least one of a CPU, a GPU and a FPGA. The arithmetic apparatus 21 reads a computer program. For example, the arithmetic apparatus 21 may read a computer program stored in the storage apparatus 22. For example, the arithmetic apparatus 21 may read a computer program stored in a computer-readable recording medium, by using a not-illustrated recording medium reading apparatus. The arithmetic apparatus 21 may obtain (namely, download or read) a computer program from a not-illustrated apparatus placed outside the reception apparatus 2 through the communication apparatus 23. The arithmetic apparatus 21 executes the read computer program. As a result, a logical functional block for performing an operation that should be performed by the reception apparatus 2 is implemented in the arithmetic apparatus 21. Specifically, a logical functional block for performing a reception operation for receiving the reception signal Rx is implemented in the arithmetic apparatus 21. Namely, the arithmetic apparatus 21 is configured to serve as a controller for implementing the logical block for performing the operation that should be performed by the reception apparatus 2.

Figure 3:
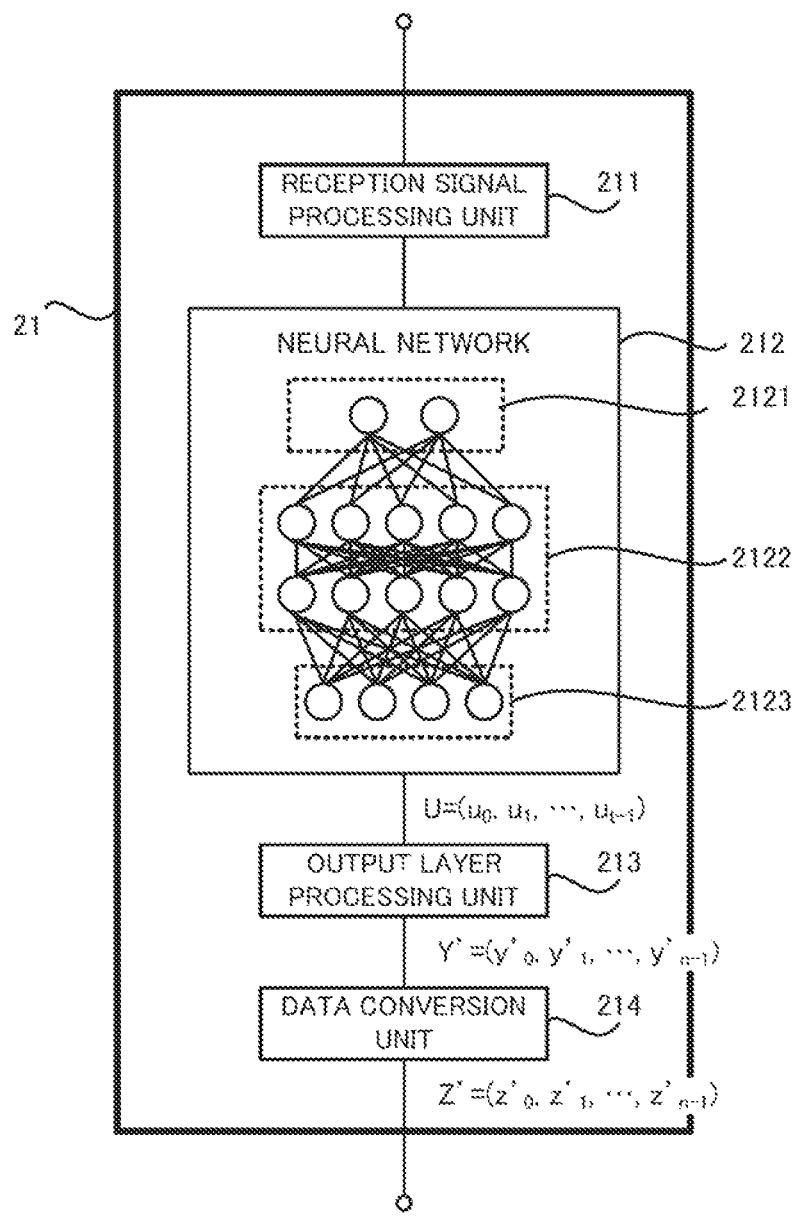
FIG. 3 is a block diagram that illustrates a configuration of logical functional blocks implemented in an arithmetic apparatus of a reception apparatus in the present example embodiment.

FIG. 3 illustrates one example of the logical functional block that is implemented in the arithmetic apparatus 21 for performing the reception operation. As illustrated in FIG. 3, a reception signal processing unit 211, a Neural Network 212, an output layer processing unit 213 that is one specific example of a "numerical conversion unit" and a data conversion unit 214 that is one specific example of a "generation unit" are implemented in the arithmetic apparatus 21. The Neural Network 212 includes an input layer 212, a hidden layer 2122 and an output layer 2123. Note that a detail of an operation of each of the reception signal processing unit 211, the Neural Network 212, the output layer processing unit 213 and the data conversion unit 214 will be described later in detail with reference to FIG. 6 and so on, however, an overview thereof will be briefly described here. The reception signal processing unit 211 is configured to extract a feature of the reception signal Rx. The Neural Network 212 includes output nodes (namely, nodes included in the output layer 2123) the number of which is equal to the bit length t. When the reception signal Rx (specifically, the feature of the reception signal Rx) is inputted into the Neural Network 212, the Neural Network 212 outputs, from the output layer 2123 including t number of the output nodes, a numerical data stream $U=(u_0, u_1, \ldots, u_{t-1})$ including numerical data the number of which is equal to the bit length t. The output layer processing unit 213 is configured to convert the numerical data stream U into a numerical data stream $Y'=(y'_0, y'_1, \ldots, y'_{n-1})$ including numerical data the number of which is equal to the bit length n. The data conversion unit 214 is configured to output a bit stream $Z'=(z'_0, z'_1, \ldots, z'_{b-1})$ a bit length of which is b by performing, on the numerical data stream Y', a conversion processing that corresponds to an inverse conversion of a conversion processing performed by the data conversion unit 111 of the transmission apparatus 1. The bit stream Z' corresponds to an estimated value of the bit stream Z transmitted by the transmission apparatus 1. Thus, a bit stream A' that is generated by combining the bit streams Z' sequentially generated corresponds to an estimated value of the bit stream A that is the time-series bit data representing the digital transmission data that should be transmitted by the transmission apparatus 1

Again in FIG. 1, the storage apparatus 22 is configured to store desired data. For example, the storage apparatus 22 may temporarily store the computer program that is executed by the arithmetic apparatus 21. The storage apparatus 22 may temporarily store data temporarily used by the arithmetic apparatus 21 when the arithmetic apparatus 21 executes the computer program. The storage apparatus 22 may store data stored for a long term by the reception apparatus 2. Note that the storage apparatus 22 may include at least one of a RAM, a ROM, a hard disk apparatus, a magneto-optical disc, a SSD and a disk array apparatus.

The communication apparatus 23 is configured to communicate with the transmission apparatus 1 through the communication line 3. In the present example embodiment, the communication apparatus 23 is configured to receive, as the reception signal Rx, the transmission signal Tx transmitted by the transmission apparatus 1.

<1-2> Operation of Communication System SYS

Next, an operation of the communication system SYS will be described. As described above, the communication system SYS performs the transmission operation for transmitting the transmission signal Tx by using the transmission apparatus 1. Moreover, the communication system SYS performs the reception operation for receiving the reception signal Rx by using the reception apparatus 2. Moreover, the communication performs a learning operation for learning parameters of the Neural Network 113 and the Neural Network 212. Thus, the transmission operation, the reception operation and the learning operation will be described in sequence below.

<1-2-1> Transmission Operation

Figure 4:
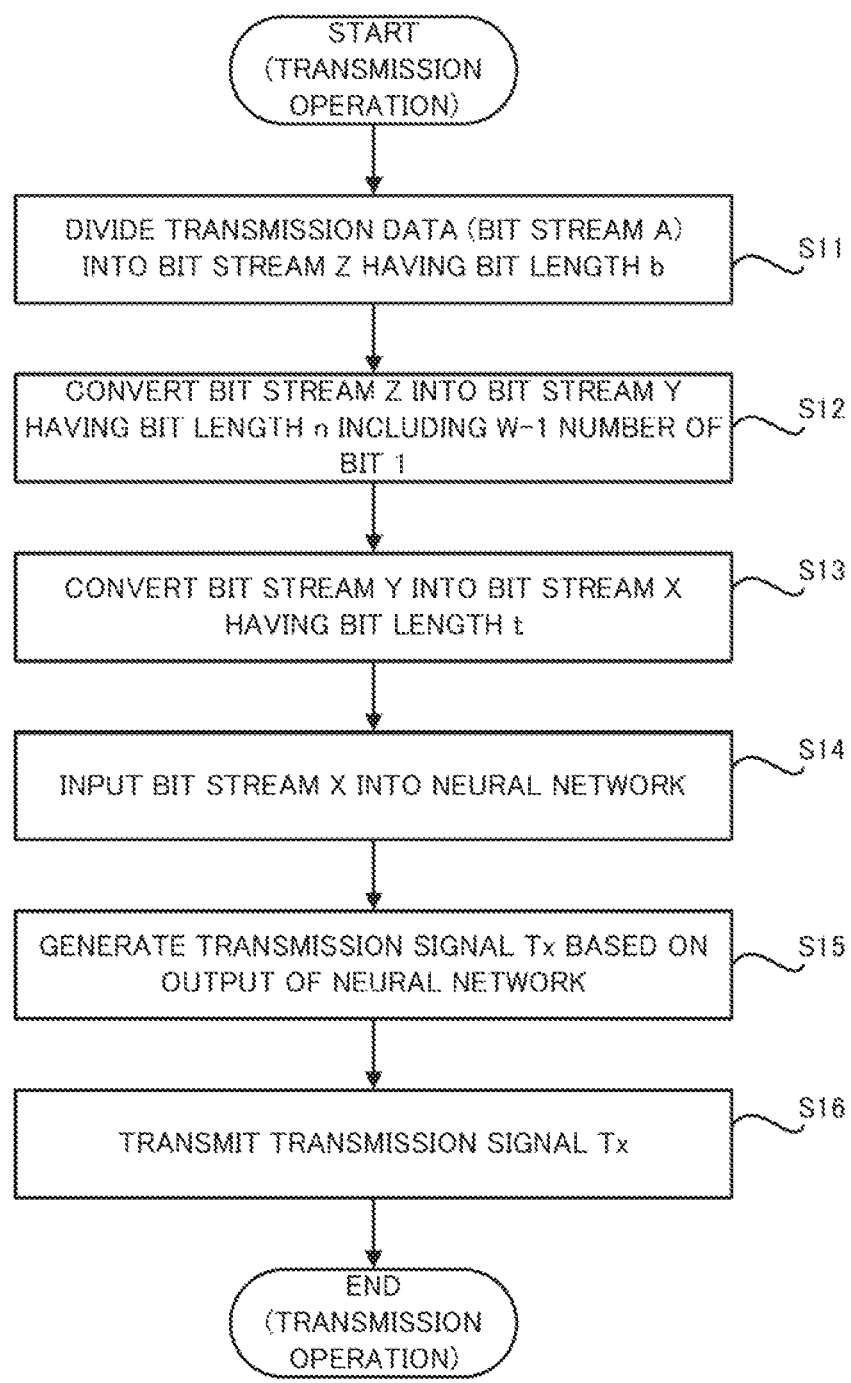
FIG. 4 is a flow chart that illustrates a flow of a transmission operation.
Figure 5:
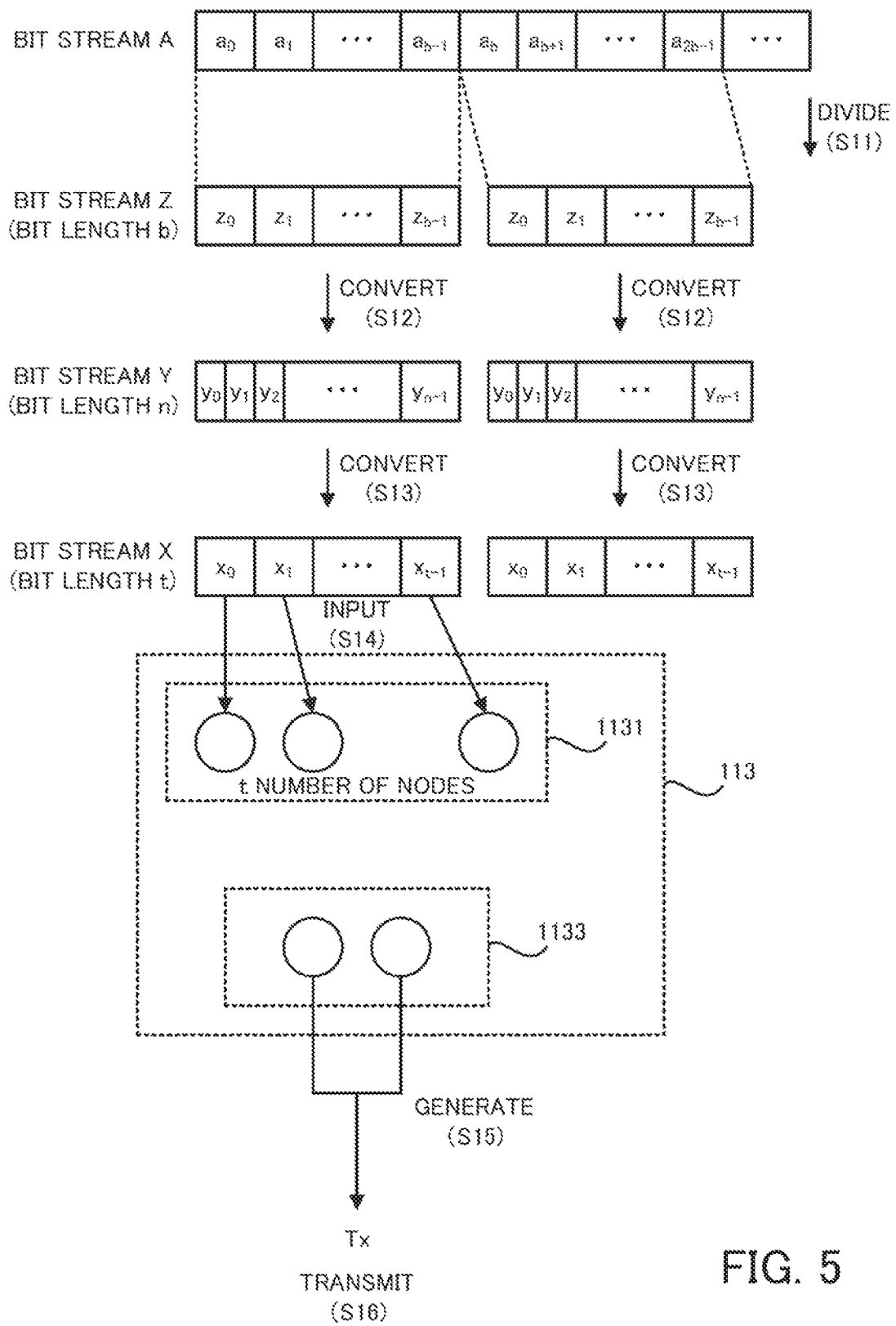
FIG. 5 is a conceptional diagram that illustrates a flow of data in the transmission operation.

Firstly, with reference to FIG. 4 and FIG. 5, the transmission operation performed by the transmission apparatus 1 will be described. FIG. 4 is a flowchart that illustrates a flow of the transmission operation. FIG. 5 is a conception view that illustrates a flow of data in the transmission operation.

As illustrated in FIG. 4 and FIG. 5, firstly, the data conversion unit 111 divides the bit stream $A=(a_0, a_1, \ldots)$ representing the transmission data that should be transmitted by the transmission apparatus 1 by a unit of the bit stream $Z=(z_0, z_1, \ldots, z_{b-1})$ the bit length of which is b (note that b is an integer that is equal to or larger than 1) (a step S11).

Then, the data conversion unit 111 converts each bit stream Z generated in the step S11 into the bit stream $Y=(y_0, y_1, \ldots, y_{n-2})$ having the bit length n that is longer than the bit length b (namely, n is an integer that satisfies n>b) (a step S12). Here, the number of 1 (namely, the number of bit 1) included in the bit stream Y is w−1 (note that w is an integer that is equal to or larger than 2 as described above). Here, it is preferable that w−1 number of bit 1 be assigned at w−1 number of bit position based on the bit array pattern of the bit stream Z (namely, the class of the bit stream Z, and a value represented by the bit stream Z), respectively. Namely, it is preferable that w−1 number of bit 1 be assigned at w−1 number of bit position that is unique to the bit array pattern of the bit stream Z, respectively. As a result, the bit stream Y has a bit array pattern (namely, an array pattern of bit 1 and bit 0) that allows the bit array pattern (namely, the class) of the bit stream Z to be uniquely identified.

An One Hot Vector is one example of the bit stream Y. The One Hot Vector corresponds to the bit stream in which w is 2. In this case, the bit length n of the bit stream Y satisfies such a condition that $n=2^b$. For example, when b is 6, the bit stream Y that uniquely identifies the bit stream Z having six bits has a bit length of 64 ($=2^6$) bits. In this case, the bit stream Y in which a d-th bit from a head of the bit stream Y is 1 and the other bit is 0 is generated. Note that a symbol "^" is a symbol for representing an exponentiation, and "C^D (note that each of C and D is a real number)" represents C to Dth (power) (namely, C to the power D).

When the number of the bit 1 included in the bit stream Y decreases (namely, w is smaller), an efficiency of the below described learning operation improves. This s because there is a high compatibility between each of the Neural Networks 113 and 212 and data in which the number of bit 1 is small (what we call sparse data). On the other hand, as the number of the bit 1 included in the bit stream Y is smaller, the bit length n of the bit stream Y that is necessary for uniquely identifying the bit array pattern (namely, the class) of the bit stream Z is longer. As a result, it is necessary for the transmission apparatus 1 (furthermore, the reception apparatus 2) to perform a processing on the bit stream having the relatively long bit length, and thus, a processing load of the transmission apparatus 1 (furthermore, the reception apparatus 2) is relatively large. On the other hand, when the number of the bit 1 included in the bit stream Y increases (namely, w is larger), the bit length n of the bit stream Y is shorter and thus the processing load of the transmission apparatus 1 (furthermore, the reception apparatus 2) is relatively small, although an effect of an improvement of the efficiency of the below described learning operation is smaller. Thus, the number of the bit 1 included in the bit stream Y (namely, the integer w) may be set to be a desired value that satisfies to some extent both of the effect of the improvement of the efficiency of the learning operation that is achievable by decreasing the number of bit 1 and an effect of a reduction of the processing load that is achievable by increasing the number of bit 1. Alternatively, the number of the bit 1 included in the bit stream Y (namely, the integer w) may be set to be a desired value that prioritizes the effect of the reduction of the processing load that is achievable by increasing the number of bit 1 over the effect of the improvement of the efficiency of the learning operation that is achievable by decreasing the number of bit 1. Alternatively, the number of the bit 1 included in the bit stream Y (namely, the integer w) may be set to be a desired value that prioritizes the effect of the improvement of the efficiency of the learning operation that is achievable by decreasing the number of bit 1 over the effect of the reduction of the processing load that is achievable by increasing the number of bit 1. Note that there is a high compatibility between the above described One Hot Vector and each of the Neural Networks 113 and 212. Thus, w may be set to be 2. However, w may be set to be an integer that is equal to or larger than 3.

Then, the input layer processing unit 112 converts the bit stream Y generated at the step S12 into the bit stream $X=(x_0, x_1, \ldots, x_{t-1})$ having the bit length t that is shorter than the bit length n (namely, t is an integer that satisfies t<n) (a step S13). In this case, it is preferable that the input layer processing unit 112 convert the bit stream Y into the bit stream X by using a binary matrix (namely, an matrix in which each element of the matrix is 0 or 1) M having a size of t number of row×n number of column. However, the input layer processing unit 112 may convert the bit stream Y into the bit stream X by using another method.

Note that the binary matrix M is generated by a below described matrix generation apparatus 4. A characteristic of the binary matrix M will be described when the matrix generation apparatus 4 will be described later, however, an overview thereof will be described here.

The binary matrix M is a matrix that satisfies such a first matrix condition that the number of element having 1 included in each column vector included in the binary matrix M is equal to or larger than w. Preferably, the binary matrix M is a matrix that satisfies such a first matrix condition that the number of element having 1 included in each column vector included in the binary matrix M is w. In this case, it is preferable that the binary matrix M be a matrix that satisfies such a condition that the number of the element having 1 included in each column vector included in the binary matrix M is equal between all column vectors. However, the binary matrix M may be a matrix that satisfies such a condition that the number of the element having 1 included in each column vector included in the binary matrix M is different between at least two column vectors.

The binary matrix M is a matrix that satisfies such a second matrix condition that the number of an element having 1 in both of any two column vectors included in the binary matrix M is 1 at most. Namely, the binary matrix M is a matrix that satisfies such a second matrix condition that the number of a row including an element having 1 is 1 at most when the elements in any two column vectors included in the binary matrix M are compared for each row. When the second matrix condition is satisfied, a logical OR of w-1 number of any column vector included in the binary matrix M does not include residual column vector. Note that a state where "a vector a does not include a vector b" means a state where a condition of "a$\vee$b$\neq$a" A symbol "$\vee$" means a logical OR. The matrix that satisfies the second matrix condition may be referred to as a (w-1) distinction matrix.

The binary matrix M may be a matrix that satisfies such a third matrix condition that it is a sparse matrix. Namely, the binary matrix M may be a matrix that satisfies such a third matrix condition that the number of a Non-Zero element (namely, the number of the element having 1) included in the binary matrix M is relatively small. In this case, the third matrix condition may include such a matrix condition that the number of the Non-Zero element (namely, the number of the element having 1) included in the binary matrix M is 1/q of the number of all elements of the binary matrix M. Note that "q" represents an exponentiation of any prime number. Note that a symbol "I" is a symbol for representing a fraction, and "E/F (note that each of E and F is a real number" represents a fraction in which F is a denominator and E is a numerator.

When the bit stream Y is converted into the bit stream X by using the binary matrix M, the input layer processing unit 112 may convert the bit stream Y into the bit stream X by using an equation 1. Note that an element at a s-th row and a t-th column in the binary matrix M is represented by "$m_{s,t}$" in the equation 1. Moreover, a symbol "·" means a logical AND.

$$x_i = (m_{i,0} \cdot y_0) \vee (m_{i,1} \cdot y_1) \vee \ldots \vee (m_{i,n-1} \cdot y_{n-1}), i = 0,1,\ldots,t-1 \quad \text{[Equation 1]}$$

The bit stream $X=(x_0, x_1, \ldots, x_{t-1})$ obtained by a calculation using the equation 1 is substantially equivalent to a vector that is obtained by calculating the logical OR of j-th column vector, which is included in n number of column vectors of the binary matrix M, corresponding to all index j (note that j is an integer that satisfies 0≤j≤n) satisfying "$y_j=2$". Namely, an operation of generating the bit stream X by using the equation 1 is substantially equivalent to an operation of designating w-1 number of column vector from the binary matrix M based on a bit position of w-1 number of bit 1 included in the bit stream Y, and setting t number of elements included in the logical OR of w-1 number of the designated column vector to be the bits $(x_0, x_1, \ldots, x_{t-1})$ included in the bit stream X. Here, the number of the bit 1 included in the bit stream Y is limited to w-1. Thus, most of the bits $(y_0, y_1, \ldots, y_{n-1})$ included in the bit stream Y is 0. Therefore, the processing load that is necessary for converting the bit stream Y into the bit stream X by using the equation 1 is relatively small. Especially, when w is set to be 2, only one of n number of bits $(y_0, y_1, \ldots, y_{n-1})$ included in the bit stream Y is bit 1. Thus, in this case, the operation of generating the bit stream X by the calculation using the equation 1 is substantially equal to an operation of extracting the j-th column vector of the binary matrix M. thus, the processing load that is necessary for converting the bit stream Y into the bit stream X by using the equation 1 is smaller. Since the processing load is reduced in this manner, even the transmission apparatus 1 having a relatively low processing capacity (namely, not having a relatively high processing capacity) is capable of properly performing the transmission operation. This is a very advantageous effect for the communication system SYS in which a cost (for example, at least one of a price cost and a size cost of a placement location) is strictly limited.

Then, the bit stream X generated at the step S14 is inputted into the Neural Network 113 (a step S14). As described above, the Neural Network 113 includes the input nodes the number of which is equal to the bit length t of the bit stream X. Namely, the Neural Network 113 included t number of the input nodes. Thus, t number of the bit $(x_0, x_1, \ldots, x_{t-1})$ included in the bit stream X are inputted into t number of the input nodes, respectively. Note that the number of the hidden layer of the Neural Network 113 may be any number.

In the present example embodiment, not the bit stream Y having the bit length n but the bit stream X that is obtained by the conversion of the bit stream Y and that has the bit length t that is shorter than the bit length n is inputted into the Neural Network 113. Thus, when the bit stream X is inputted into the Neural Network 113, the number of the input node of the Neural Network 113 is smaller, compared to a case where the bit stream Y is inputted into the Neural Network 113. When the number of the input node is smaller, the number of a hidden node (namely, a node included in the hidden layer 1132) of the Neural Network 113 is also reducible. Therefore, when the bit stream X is inputted into the Neural Network 113, a size of the Neural Network 113 can be smaller, compared to a case where the bit stream Y is inputted into the Neural Network 113. As a result, the processing load of the communication system using the Neural Network 113 is smaller. Since the processing load is reduced in this manner, even the transmission apparatus 1 having the relatively low processing capacity (namely, not having the relatively high processing capacity) is capable of properly performing the transmission operation. This is a very advantageous effect for the communication system SYS in which the cost (for example, at least one of the price cost and the size cost of a placement location) is strictly limited.

When the bit stream X is inputted into the Neural Network 113, the Neural Network 113 outputs the index value designating the transmission signal Tx (namely, the index value designating the feature of the transmission signal Tx). Thus, it is preferable that the number of the output node of the Neural Network 113 be set to be equal to the number of the index value that should be outputted by the Neural Network 113 (namely, the number of the feature of the transmission signal Tx). Note that a feature relating to a signal point (namely, a signal point of a digital modulation signal) is one example of the feature of the transmission signal Tx. For example, when a QAM (Quadrature Amplitude Modulation) is used as a modulation method of the communication system SYS, an amplitude of each of two orthogonal carrier wave. Is one example of the feature relating to the signal point. In this case, the number of the output node of the Neural Network 113 may be 2.

Then, the transmission signal generation unit 114 generates the transmission signal Tx based on the output of the Neural Network 113 (namely, the output of the output layer 1133) (a step S15). Namely, the transmission signal generation unit 114 generates the transmission signal Tx that has the feature indicated by the index value outputted from the Neural Network 113. Then, the communication apparatus 13 transmits the transmission signal Tx generated at the step S15 to the reception apparatus 2 through the communication line (a step S16).

Figure 6:
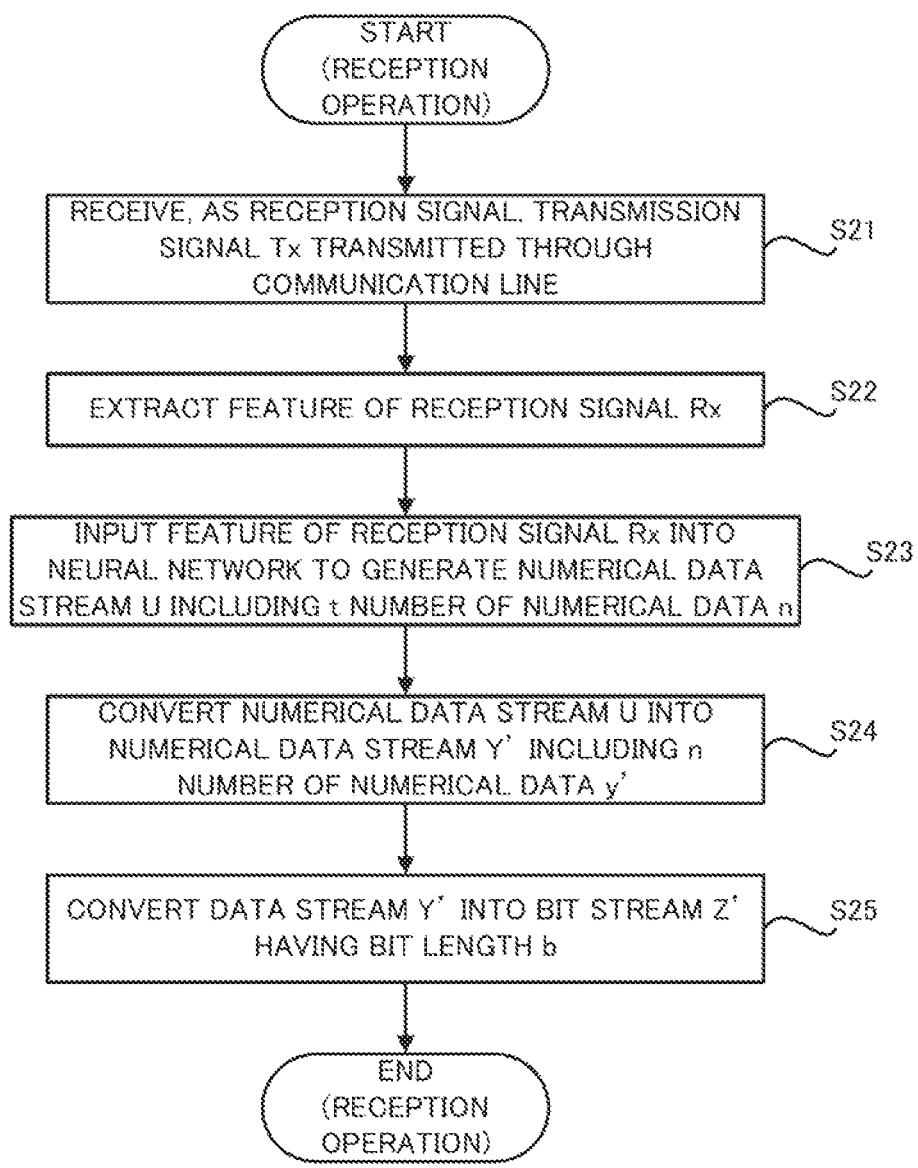
FIG. 6 is a flow chart that illustrates a flow of a reception operation.
Figure 7:
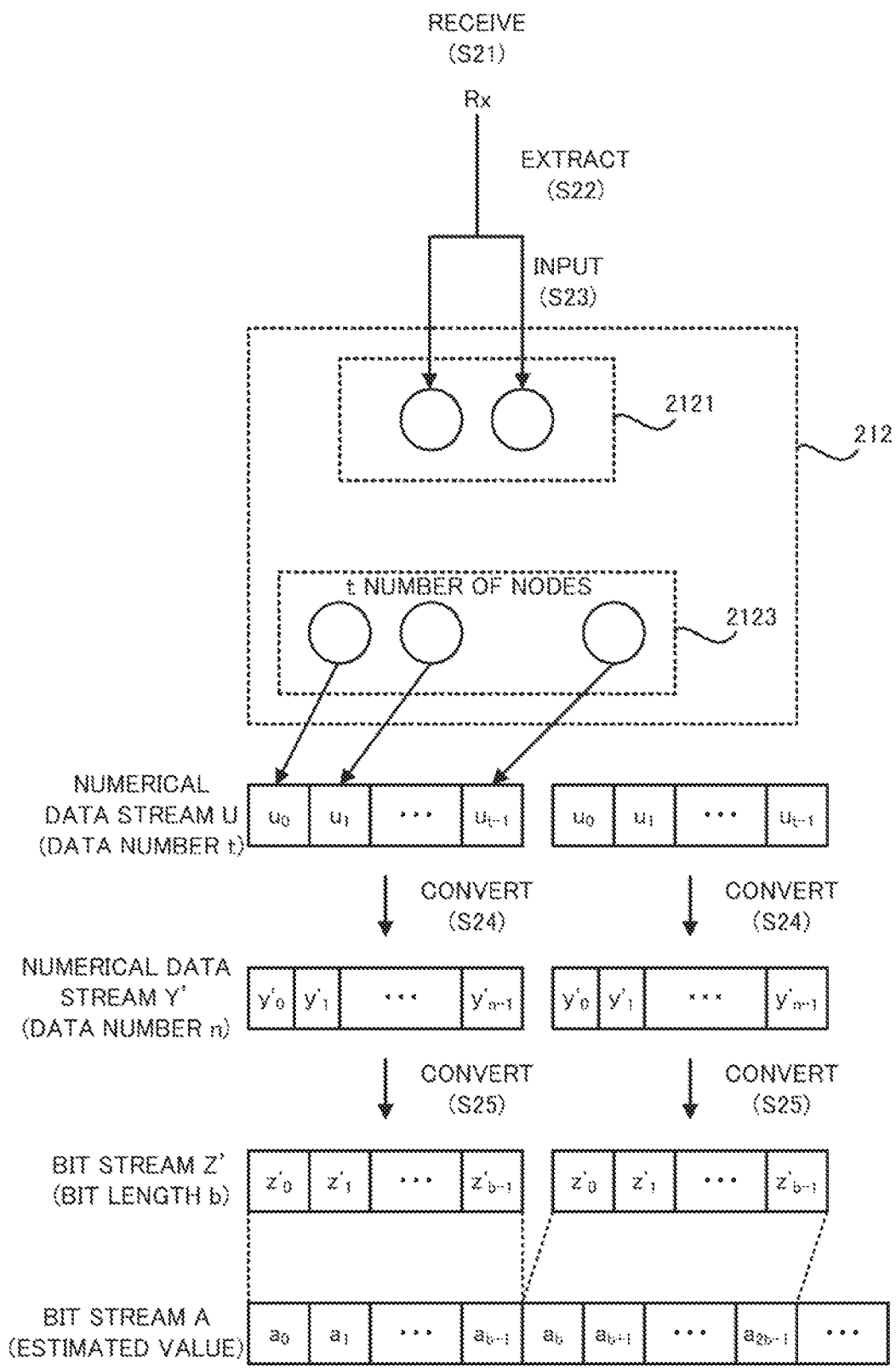
FIG. 7 is a conceptional diagram that illustrates a flow of data in the reception operation.

<1-2-2> Reception Operation Next, with reference to FIG. 6 and FIG. 7, the reception operation performed by the reception apparatus 2 will be described. FIG. 6 is a flowchart that illustrates a flow of the reception operation. FIG. 7 is a conception view that illustrates a flow of data in the reception operation.

As illustrated in FIG. 6 and FIG. 7, firstly, the communication apparatus 23 receives, as the reception signal Rx, the transmission signal Tx transmitted by the transmission apparatus 1 through the communication line (a step S21).

Then, the reception signal processing unit 211 extract the feature of the reception signal Rx received at the step S21 (a step S22). For example, the reception signal processing unit 211 may extract any number of the feature of the reception signal Rx. For example, the reception signal processing unit 211 may extract the feature of the reception signal Rx the number of which is equal to the number of the index value outputted from the Neural Network 113 of the transmission apparatus 1 (namely, the number of the feature of the transmission signal Tx). As one example, when the QAM is used as the modulation method of the communication system SYS as described above, the reception signal processing unit 211 may extract the feature relating to the signal point of the reception signal Rx (for example, an amplitude of each of two orthogonal carrier waves).

The feature of the reception signal Rx extracted at the step S22 is equal to the feature of the transmission signal Tx, when the transmission signal Tx is transmitted through the ideal communication line 3 (namely, the communication line 3 in which there is no disturbance). On the other hand, the feature of the reception signal Rx extracted at the step S22 is not necessarily equal to the feature of the transmission signal Tx, when there is a disturbance in the communication line 3. However, as described below, the reception apparatus 2 is capable of properly estimating the transmission signal Tx even in this case.

Then, the feature of the reception signal Rx extracted at the step S22 is inputted into the Neural Network 212 (a step S23). Here, it is preferable that the number of an input node of the Neural Network 212 (namely, a node included in the input layer 2121) be equal to the feature of the reception signal Rx extracted at the step S22. For example, when the reception signal processing unit 211 extracts the feature relating to the signal point of the reception signal Rx (for example, the amplitude of each of two orthogonal carrier waves), it is preferable that the number of the input node of the Neural Network 212 be two.

When the feature of the reception signal Rx is inputted into the Neural Network 212, the Neural Network 212 outputs a numerical data stream $U=(u_0, u_1, \ldots, u_{t-1})$ including the numerical data u the number of which is equal to the bit length t (a step S23). As described above, the Neural Network 212 includes the output node the number of which is equal to the bit length t. thus, t number of the output nodes output t number of numerical data $(u_0, u_1, \ldots, u_{t-1})$, respectively. Note that the number of a hidden node of the Neural Network 212 may be any number.

Then, the output layer processing unit 213 converts the numerical data stream U generated at the step S23 into the numerical data stream $Y'=(y'_0, y'_1, \ldots, y'_{n-1})$ including the numerical data y' the number of which is equal to the bit length n (a step S24). In this case, it is preferable that the output layer processing unit 213 convert the numerical data stream U into the numerical data stream Y' by using the binary matrix M used by the input layer processing unit 112. Specifically, the output layer processing unit 213 may convert the numerical data stream U into the numerical data stream Y' by using an equation 2. Namely, the output layer processing unit 213 may calculate a n-dimensional row vector (namely, a numerator of the equation 2) by multiplying the binary matrix M with a t-dimensional row vector including t number of the numerical data $(u_0, u_1, \ldots, u_{t-1})$ included in the numerical data stream U, and generate n number of the numerical data $(y'_0, y'_1, \ldots, y'_{n-1})$ by dividing each element of the calculated n-dimensional row vector by the number of an element that is 1 included in each column vector of the binary matrix M (namely, a denominator of the equation 2). However, the output layer processing unit 213 may convert the numerical data stream U into the numerical data stream Y' by using another method.

$$y'_k = \frac{\sum_{i=0}^{t-1}(m_{i,k} \cdot u_i)}{\sum_{i=0}^{t-1} m_{i,k}}, k = 0, 1, \ldots, n-1 \qquad \text{[Equation 2]}$$

Here, as described above, the binary matrix M is the sparse matrix (namely, the matrix in which the number of the element having 1 is relatively small. Thus, the number of sum-of-product processing necessary for calculating the numerator of the equation 2 is relatively small. Furthermore, as described above, it is preferable that the number of 1 included in each column vector (namely, a column weight) be constant in the binary matrix M. In this case, the denominator of the equation 2 is a constant value. Thus, a processing load necessary for converting the numerical data stream U into the numerical data stream Y' by using the equation 2 is relatively small. Since the processing load is reduced in this manner, even the reception apparatus 2 having a relatively low processing capacity (namely, not having a relatively high processing capacity) is capable of properly performing the reception operation. This is a very advantageous effect for the communication system SYS in which the cost (for example, at least one of the price cost and the size cost of the placement location) is strictly limited.

When the numerical data stream U is converted into the numerical data stream Y' by using the equation 2, it is preferable that the Neural Network 212 output the numerical data stream U including t number of the numerical data $(u_0, u_1, \ldots, u_{t-1})$ satisfying $0 \leq u_0, u_1, \ldots, u_{t-1} \leq 1$. Note that "$0 \leq u_0, u_1, \ldots, u_{t-1} \leq 1$" means that each of the numerical data $u_0$, the numerical data and the numerical data $u_{t-1}$ is equal to or larger than 0 and is equal to or smaller than 1. In this case, a sigmoid function may be used as a final activation function of the output layer 2123 of the Neural Network 212. However, the Neural Network 212 may output the numerical data stream U including t number of the numerical data ($u_0$, $u_1$, ..., $u_{t-1}$) not satisfying $0 \leq u_0, u_1, \ldots, u_{t-1} \leq 1$. A function that is different from the sigmoid function may be used as the final activation function of the output layer 2123 of the Neural Network 212.

The numerical data stream $Y'=(y'_0, y'_1, \ldots, y'_{n-1})$ generated at the step S24 is equal to the bit stream $Y=(y_0, y_1, \ldots, y_{n-1})$, when the transmission signal Tx is transmitted through the ideal communication line 3 (namely, the communication line 3 in which there is no disturbance). On the other hand, there is a possibility that the numerical data stream $Y'=(y'_0, y'_1, \ldots, y'_{n-1})$ generated at the step S24 is not equal to the bit stream $Y=(y_0, y_1, \ldots, y_{n-1})$, when there is the disturbance in the communication line 3. However, the learning operation described below allows the numerical data stream $Y'=(y'_0, y'_1, \ldots, y'_{n-1})$ generated at the step S24 to be regarded to have very closer values or to be substantially equal to the bit stream $Y=(y_0, y_1, \ldots, y_{n-1})$, even when there is the disturbance in the communication line 3. Thus, it can be said that the output layer processing unit 213 substantially performs an operation for estimating the numerical data stream Y.

Here, since the output layer processing unit 213 output the numerical data stream Y' including n number of the numerical data y', the Neural Network 212 may not the numerical data stream Y' including n number of the numerical data y'. Specifically, it is enough for the Neural Network 212 to output the numerical data stream U including t number, which is smaller than n number, of the numerical data u. As a result, the number of the output node of the Neural Network 212 is smaller, compared to a case where the Neural Network 212 may not the numerical data stream Y' including n number of the numerical data y'. When the number of the output node is smaller, the number of a hidden node (namely, a node included in the hidden layer 2122) of the Neural network 212 is also reducible. Therefore, when the Neural Network 212 outputs the numerical data stream U including t number, a size of the Neural Network 212 can be smaller, compared to a case where the Neural Network 212 to output the numerical data stream Y' including n number of the numerical data y'. As a result, the processing load of the communication system using the Neural Network 212 is smaller. Since the processing load is reduced in this manner, even the reception apparatus 2 having the relatively low processing capacity (namely, not having the relatively high processing capacity) is capable of properly performing the reception operation. This is a very advantageous effect for the communication system SYS in which the cost (for example, at least one of the price cost and the size cost of a placement location) is strictly limited.

Then, the data conversion unit 214 outputs the bit stream $Z'=(z'_0, z'_1, \ldots, z'_{b-1})$ the bit length of which is b by performing, on the numerical data stream Y' generated at the step S24, the conversion processing that corresponds to the inverse conversion of the conversion processing performed by the data conversion unit 111 of the transmission apparatus 1 (a step S25). Specifically, the data conversion unit 214 selects, from n number of the numerical data ($y'_0, y'_1, \ldots, y'_{n-1}$) included in the numerical data stream Y', w−1 number of numerical data y having larger value. Then, the data conversion unit 214 generates the bit stream in which w−1 number of bit is 1, wherein w−1 number of bit is assigned to w−1 number of bit positions, respectively, corresponding to w−1 number of the selected numerical data y, and a bit assigned to a bit position corresponding to the non-selected numerical data y is 0. Then, the data conversion unit 214 performs, on the generated bit stream, the conversion processing that corresponds to the inverse conversion of the conversion processing performed by the data conversion unit 111 of the transmission apparatus 1. As a result, the bit stream $Z'=(z'_0, z'_1, \ldots, z'_{b-1})$ is generated.

The bit stream $Z'=(z'_0, z'_1, \ldots, z'_{b-1})$ generated at the step S25 is equal to the bit stream bit stream $Z=(z_0, z_1, \ldots, z_{b-1})$, when the transmission signal Tx is transmitted through the ideal communication line 3 (namely, the communication line 3 in which there is no disturbance). On the other hand, even when there is the disturbance in the communication line 3, there is a high possibility that bit stream $Z'=(z'_0, z'_1, \ldots, z'_{b-1})$ generated at the step S25 is equal to the bit stream bit stream $Z=(z_0, z_1, \ldots, z_{b-1})$. This is because even when the numerical data stream $Y'=(y'_0, y'_1, \ldots, y'_{n-1})$ is not equal to the bit stream $Y=(y_0, y_1, \ldots, y_{n-1})$ due to the disturbance in the communication line 3 as described above, there is a higher possibility that the bit position corresponding to the relatively large numerical data y in the numerical data steam Y' is same as the bit position to which the bit 1 is assigned in the numerical data stream Y due to the learning operation described below.

Then, the data conversion unit 214 is capable of estimating the bit stream A transmitted by the transmission apparatus 1 by combining the bit streams Z' that are sequentially generated.

As described above, the reception apparatus 2 is capable of estimating the transmission signal Tx that is not affected by the disturbance (namely, the bit stream A transmitted by the transmission apparatus 1 by decoding the reception signal Rx, even when the transmission signal Tx that is affected by the disturbance in the communication line 3 is received as the reception signal Rx. In this case, it can be interpreted that the reception apparatus 2 serves as a classifier that is configured to estimate which of the plurality of signal patterns of the transmission signal Tx (namely, the number of the class of the transmission signal Tx, and equivalent to the plurality of bit array pattern of the bit stream A represented by the transmission signal Tx) is closest to the signal pattern of the reception signal Rx.

<1-2-3> Learning Operation

Next, the learning operation for learning the parameters of the Neural Network 113 and the Neural Network 212 will be described. Note that the learning operation may be performed before the communication system SYS (namely, the transmission apparatus 1 and the reception apparatus 2) is shipped from a factory. Alternatively, the learning operation may be performed after the communication system SYS (namely, the transmission apparatus 1 and the reception apparatus 2) is shipped from a factory. For example, the learning operation may be performed after the communication system SYS is placed at its placement location. In this case, the learning operation may be performed online.

When the learning operation is performed, the bit stream A for learning is inputted into the transmission apparatus 1. Alternatively, when the learning operation is performed after the communication system SYS is placed at its placement location, the bit stream A that should be actually transmitted by the transmission apparatus 1 may be inputted into the transmission apparatus 1. As a result, the transmission apparatus 1 generates the bit stream Z, then generates the bit stream Y, then generates the bit stream X, then generates the transmission signal Tx, and then transmits the transmission signal Tx to the reception apparatus 2. After the reception apparatus 2 receives the transmission signal Tx, the reception apparatus 2 generates the numerical data stream U, then generates the numerical data stream Y', then generates the bit stream Z' and then estimate the bit stream A.

Here, as described above, the numerical data stream Y' generated by the reception apparatus 2 should be equal to the bit stream Y generated by the transmission apparatus 1. Thus, the bit stream Y is usable as a ground truth label of the numerical data stream Y'. Thus, the communication system SYS may learn the parameters of the Neural Network 113 and the Neural Network 212 based on a loss function that is based on the bit stream Y and the numerical data stream Y'. For example, the communication system SYS may learn the parameters of the Neural Network 113 and the Neural Network 212 so that the loss function decreases (typically, is minimized). A loss function based on a cross entropy between the bit stream Y and the numerical data stream Y' represented by an equation 3 is one example of the loss function.

$$L(Y', Y) = -\sum_{i=0}^{n-1}(y_i \log(y'_i) + (1-y_i) \log(1-y'_i))$$ [Equation 3]

The communication system SYS may learn the parameters of the Neural Network 113 and the Neural Network 212 by using an existing learning algorithm that is used for learning a parameter of a Neural Network. For example, the communication system SYS may learn the parameters of the Neural Network 113 and the Neural Network 212 by using a Backpropagation method. Here, the bit stream Y is inputted into the Neural Network 113 through the input layer processing unit 112 that is different from the Neural Network 113. However, since the input layer processing unit 112 performs a processing using the binary matrix M as described above, the processing using the binary matrix M performed by the input layer processing unit 112 may be substantially regarded to be a processing using the binary matrix M performed by the Neural Network 113. Similarly, the numerical data stream Y' is generated by the output layer processing unit 213 that is different from the Neural Network 212. However, since the output layer processing unit 213 performs a processing using the binary matrix M as described above, the processing using the binary matrix M performed by the output layer processing unit 213 may be substantially regarded to be a processing using the binary matrix M performed by the Neural Network 212. Therefore, even when the communication system SYS includes the input layer processing unit 112 and the output layer processing unit 213 that are different from a Neural Network, the parameters of the Neural Network 113 and the Neural Network 212 are learnable by using the existing learning algorithm that is used for learning the parameter of the Neural Network.

In the present example embodiment, the size of each of the Neural Network 113 and the Neural Network 212 is relatively small as described above. thus, a load of the learning operation for the parameter of each of the Neural Network 113 and the Neural Network 212 is also small. Furthermore, the number of transmission data for a test (namely, a test sample) necessary for performing the learning operation is also relatively small. Namely, the processing load necessary for performing the learning operation is also reduced. Since the processing load is reduced in this manner, even transmission apparatus 1 and the reception apparatus 2 having the relatively low processing capacity (namely, not having the relatively high processing capacity) are capable of properly performing the learning operation. Therefore, the communication system SYS can achieve such a practically very advantageous effect that the learning operation is properly performed not only before the communication system SYS is shipped from the factory but also after the communication system SYS is shipped from the factory. Therefore, it is possible to build the Neural Networks 113 and 212 that are optimized based on an effect of the disturbance in each communication line 3 to which the communication system SYS is applied. This is a very advantageous effect for the communication system SYS that is applied to the communication line 3 in which the effect of the disturbance may vary.

<2> Matrix Generation Apparatus 4

Next, the matrix generation apparatus 4 that is configured to generate the binary matrix M will be described.

<2-1> Configuration of Matrix Generation Apparatus 4

Figure 8:
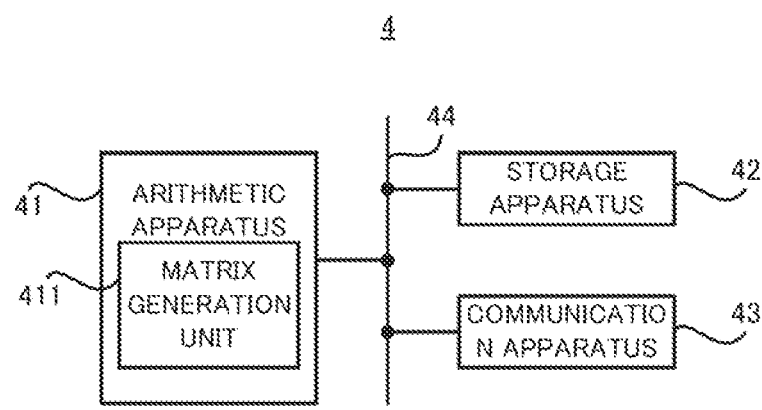
FIG. 8 is a block diagram that illustrates a configuration of a matrix generation apparatus in the present example embodiment.

Firstly, with reference to FIG. 8, a configuration of the matrix generation apparatus 4 in the present example embodiment will be described. FIG. 8 is a block diagram that illustrates the configuration of the matrix generation apparatus 4 in the present example embodiment.

As illustrated in FIG. 8, the matrix generation apparatus 4 includes an arithmetic apparatus 41, a storage apparatus 42 and a communication apparatus 43. The arithmetic apparatus 41, the storage apparatus 42 and the communication apparatus 43 may be interconnected through a data bus 44.

The arithmetic apparatus 41 may include at least one of a CPU, a GPU and a FPGA. The arithmetic apparatus 41 reads a computer program. For example, the arithmetic apparatus 41 may read a computer program stored in the storage apparatus 42. For example, the arithmetic apparatus 41 may read a computer program stored in a computer-readable recording medium, by using a not-illustrated recording medium reading apparatus. The arithmetic apparatus 41 may obtain (namely, download or read) a computer program from a not-illustrated apparatus placed outside the matrix generation apparatus 4 through the communication apparatus 43. The arithmetic apparatus 41 executes the read computer program. As a result, a logical functional block for performing an operation that should be performed by the matrix generation apparatus 4 is implemented in the arithmetic apparatus 41. Specifically, a matrix generation unit 411 that is a logical functional block for generating the binary matrix M is implemented in the arithmetic apparatus 41. Namely, the arithmetic apparatus 41 is configured to serve as a controller for implementing the logical block for performing the operation that should be performed by the matrix generation apparatus 4.

The storage apparatus 42 is configured to store desired data. For example, the storage apparatus 42 may temporarily store the computer program that is executed by the arithmetic apparatus 41. The storage apparatus 42 may temporarily store data temporarily used by the arithmetic apparatus 41 when the arithmetic apparatus 41 executes the computer program. The storage apparatus 42 may store data stored for a long term by the matrix generation apparatus 4. Note that the storage apparatus 42 may include at least one of a RAM, a ROM, a hard disk apparatus, a magneto-optical disc, a SSD and a disk array apparatus.

The communication apparatus 43 is configured to communicate with each of the transmission apparatus 1 and the reception apparatus 2 through the communication line 3

(alternatively, a communication line that is different from the communication line 3). In the present example embodiment, the communication apparatus 43 is configured to transmit the binary matrix M generated by a matrix generation method to each of the transmission apparatus 1 and the reception apparatus 2. The transmission apparatus 1 receives the binary matrix M transmitted by the matrix generation apparatus 4 through the communication apparatus 13, and performs the above described transmission operation by using the received binary matrix M. The reception apparatus 2 receives the binary matrix M transmitted by the matrix generation apparatus 4 through the communication apparatus 23, and performs the above described reception operation by using the received binary matrix M.

Figure 9:
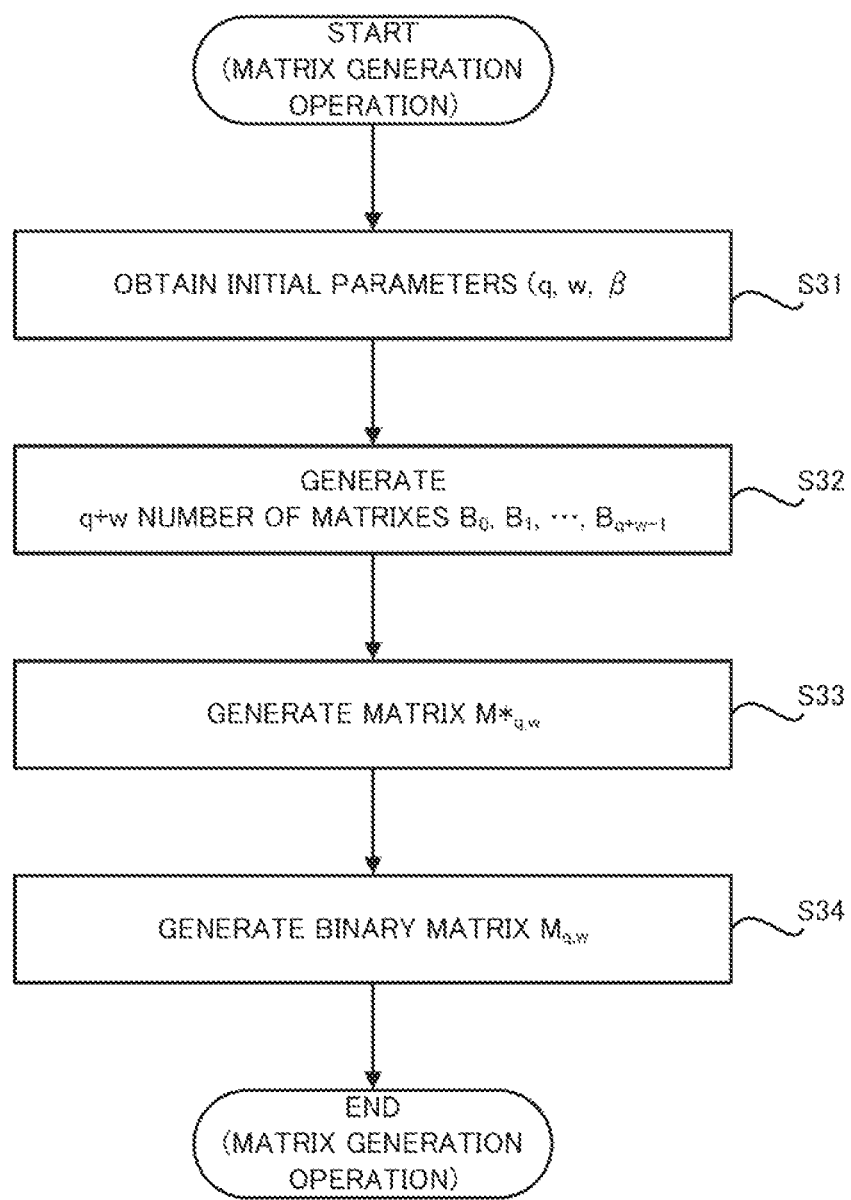
FIG. 9 is a flow chart that illustrates a flow of a matrix generation operation.

<2-2> Matrix Generation Operation Next, with reference to FIG. 9, the matrix generation operation will be described. FIG. 9 is a flowchart that illustrates a flow of the matrix generation operation.

As illustrated in FIG. 9, the matrix generation unit 411 sets an initial parameter that is necessary for generating the binary matrix M (a step S31).

The initial parameter may include the exponentiation q of any prime number, for example. Note that the exponentiation q used by the matrix generation operation is equal to the exponentiation q used by the above described third matrix condition of the binary matrix M. Therefore, the exponentiation q used by the above described third matrix condition of the binary matrix M may be set by the matrix generation operation.

The initial parameter may include the integer w described in the transmission operation and the reception operation described above, for example. note that the integer w used by the matrix generation operation is equal to the integer w that should be used by the transmission operation and the reception operation described above. Therefore, the integer w used by the transmission operation and the reception operation described above may be set by the matrix generation operation. Since the integer w is an integer that is equal to or larger than 2 as described above, the matrix generation unit 411 set the integer w to be the integer that is equal to or larger than 2. Furthermore, the integer w is an integer that is equal to or smaller than q+1. Thus, the matrix generation unit 411 set the integer w to be the integer that is equal to or larger than 1 and that is equal to or smaller than q+1.

The initial parameter may include a primitive element $\beta$ of a finite field in which an order is $q^2$.

Then, the matrix generation unit 411 generates q+w number of matrixes $B_i$ (note that i is 1, 2, ..., and q+w) (a step S32). Namely, the matrix generation unit 411 generates the matrixes $B_0$ to $B_{q+-1}$. A size of the matrix $B_i$ is q number of row×(q−1) number of column.

Figure 10:
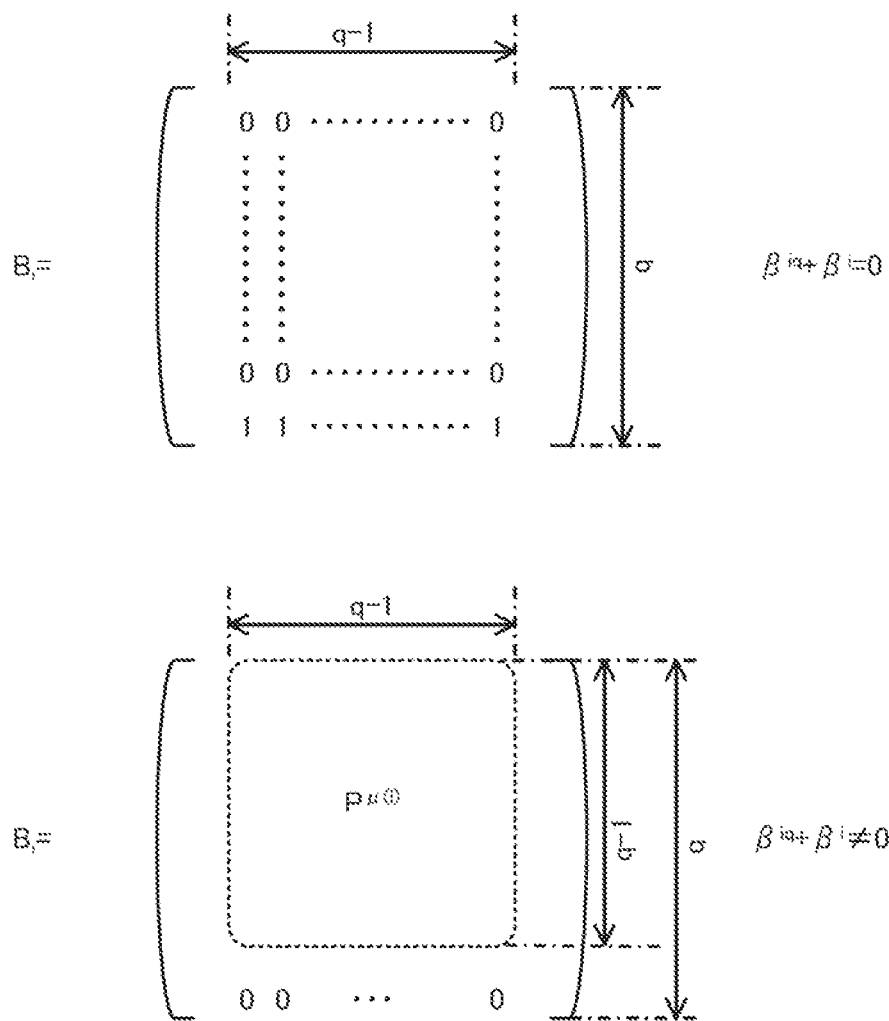
FIG. 10 illustrates a matrix that is used in a process of generating a binary matrix.
Figure 11:
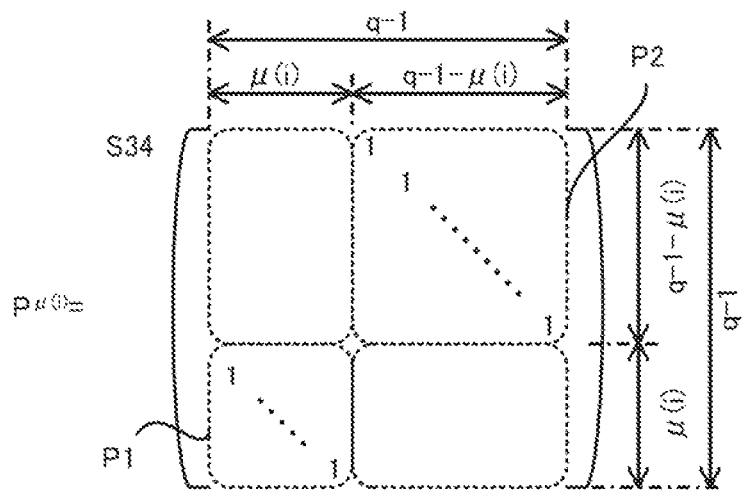
FIG. 11 illustrates a matrix that is used in a process of generating the binary matrix.

The matrix $B_i$ is a matrix having one element that is 1 in each column vector. Namely, the matrix $B_i$ is a matrix in which the number of the element that is 1 in each column vector is one. In this case, the matrix generation unit 411 may generate q+w number of the matrixes $B_i$ each of which has one element that is 1 in each column vector based on a rule illustrated in FIG. 10. Note that an element corresponding to a space in the matrix illustrated in the drawings is zero if there is no notation. Specifically, as illustrated in FIG. 10, when $\beta^{iq}+\beta^i=0$ is satisfied, the matrix generation unit 411 may generate, as the matrix $B_i$, a matrix in which all of the elements in the last row vector are 1 and all of the other elements are 0. On the other hand, as illustrated in FIG. 10, when $\beta^{iq}+\beta^i=0$ is not satisfied, the matrix generation unit 411 may generate, as the matrix $B_i$, a matrix that is obtained by adding, to a matrix $P^{\mu(i)}$ having a size of (q−1) number of row×(q−1) number of column, a row vector in which all of elements are 0 as the last row vector. The matrix $P^{\mu(i)}$ is a matrix illustrated in FIG. 11. As illustrated in FIG. 11, the matrix $P^{\mu(i)}$ is a matrix in which a first diagonal matrix P1 having $\mu(i)$ number of row×$\mu(i)$ number of column in which a diagonal element is 1 and a second diagonal matrix P2 having (q−1−$\mu(i)$) number of row×(q−1−$\mu(i)$) number of column in which a diagonal element is 1 are arranged in an inverse diagonal pattern and all of the other elements are 0. Note that "$\mu(i)$" is an integer which is equal to or larger than 0, which is equal to or smaller than q−2 and which is uniquely determined as a value that satisfies $\beta^{(q+1)\mu(i)}=\beta^{iq}+\beta^i$ when $\beta^{iq}+\beta^i=0$ is not satisfied.

Figure 12:
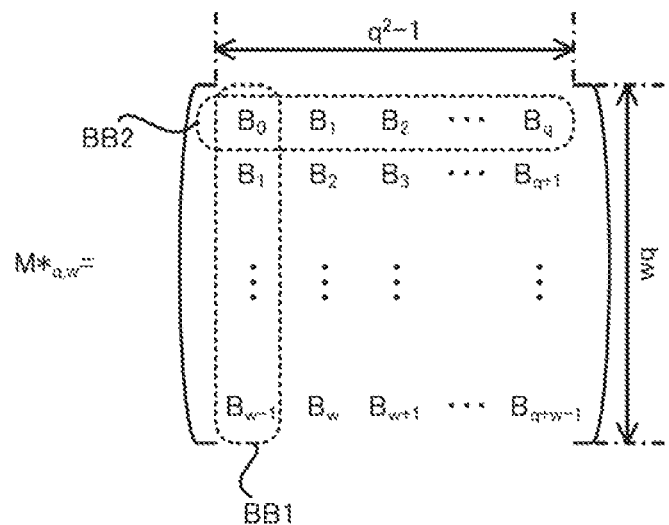
FIG. 12 illustrates a matrix that is used in a process of generating the binary matrix.

Then, the matrix generation unit 411 generates a matrix $M^*_{q,w}$ having a size of wq number of row×($q^2-1$) number of column by using q+w number of the matrix $B_0$ to $B_{q+w-1}$ generated at the step S32 (a step S33). The matrix $M^*_{q,w}$ is a matrix illustrated in FIG. 12. As illustrated in FIG. 12, the matrix generation unit 411 generates the matrix $M^*_{q,w}$ by arranging q+1 number of block matrixes BB1, each of which includes w number of the sequential matrixes $B_i$ arranged along a column direction, along a row direction while incrementing a variable number i of the matrix $B_i$ at a head row included in the block matrix BB1 by one. Specifically, the matrix generation unit 411 generates the matrix $M^*_{q,w}$ by arranging, along the row direction, the block matrix BB1 including w number of the sequential matrixes $B_0$ to $B_{w-1}$ arranged along the column direction, the block matrix BB1 including w number of the sequential matrixes $B_1$ to $B_w$ arranged along the column direction, ..., and the block matrix BB1 including w number of the sequential matrixes $B_q$ to $B_{q+w-1}$ arranged along the column direction. Note that the matrix generation unit 411 may generate the matrix $M^*_{q,w}$ by arranging w number of block matrixes BB2, each of which includes q+1 number of the sequential matrixes $B_i$ arranged along the row direction, along the column direction while incrementing the variable number i of the matrix $B_i$ at a head column included in the block matrix BB2 by one. Specifically, the matrix generation unit 411 generates the matrix $M^*_{q,w}$ by arranging, along the column direction, the block matrix BB2 including q+1 number of the sequential matrixes $B_0$ to $B_q$ arranged along the row direction, the block matrix BB2 including q+1 number of the sequential matrixes $B_1$ to $B_{q+1}$ arranged along the row direction, ..., and the block matrix BB2 including q+1 number of the sequential matrixes $B_{w-1}$ to $B_{q+w-1}$ arranged along the row direction.

Figure 13:
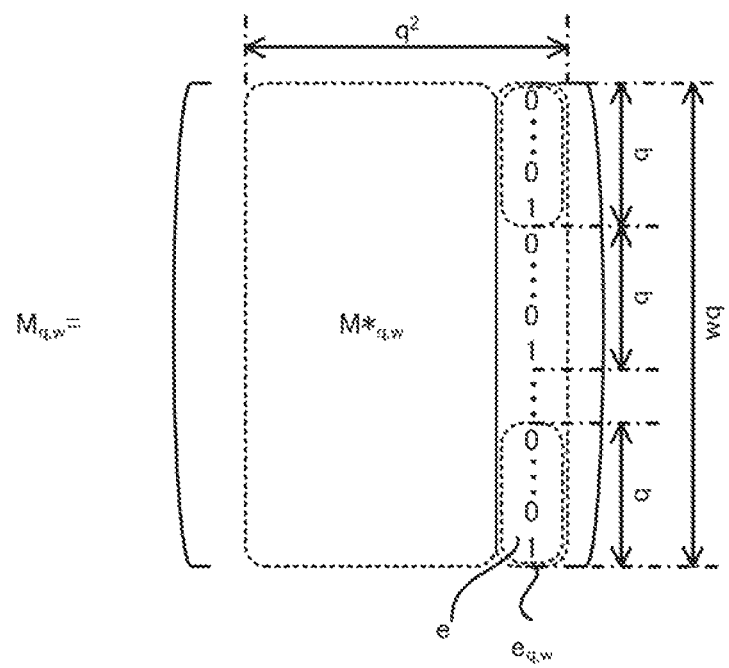
FIG. 13 illustrates the binary matrix.

Then, the matrix generation unit 411 generates a binary matrix $M_{q,w}$ having a size of wq number of row×$q^2$ number of column by adding, to the matrix $M^*_{q,w}$ generated at the step S33, a column vector $e_{q,w}$ including w number of elements that are 1 as the last row vector (a step S34). The binary matrix $M_{q,w}$ is a matrix illustrated in FIG. 13. As illustrated FIG. 13, the column vector $e_{q,w}$ is a column vector in which w number of unit column vectors e, which includes q number of component in which an element at the last column is 1 and the other element is 0, are arranged along the column direction, for example.

Note that the binary matrix $M_{q,w}$ is used as the binary matrix M used by the transmission operation and the reception operation. Here, as described above, the binary matrix M is the matrix having the size of t number of row×n number of column. Therefore, in this case, t=wq and n=$q^2$.

The binary matrix $M_{q,w}$ generated in this manner is a matrix that satisfies the above described first to third matrix conditions. Namely, the binary matrix $M_{q,w}$ is a matrix that satisfies such a condition that the number of 1 included in each column vector is w, the number of the element having 1 in both of any two column vectors is 1 at most and the number of the Non-Zero element (namely, the number of the element having 1) included in the binary matrix M is 1/q of the number of all elements of the binary matrix M. Namely, the binary matrix $M_{q,w}$ is the (w−1) distinction matrix in which a weight of each column (namely, the number of the element having 1) is w.

Here, when the binary matrix M that satisfies the second matrix condition especially is used, a hamming distance between the column vectors is relatively large. As a result, an error probability in the learning operation is reduced, and as a result, the efficiency of the learning operation improves. Namely, a robustness relative to an error of the learning operation improves. As a result, the parameters of the Neural Networks 113 and 212 are learned by the above described learning operation without reducing a learning accuracy. Furthermore, when the binary matrix M that satisfies the third matrix condition especially is used, the processing load necessary for the processing using the binary matrix M is reduced. Especially, the effect of the reduction of the processing load is more remarkable as the exponentiation p is larger.

<2-3> Matrix Extension Operation

Figure 14:
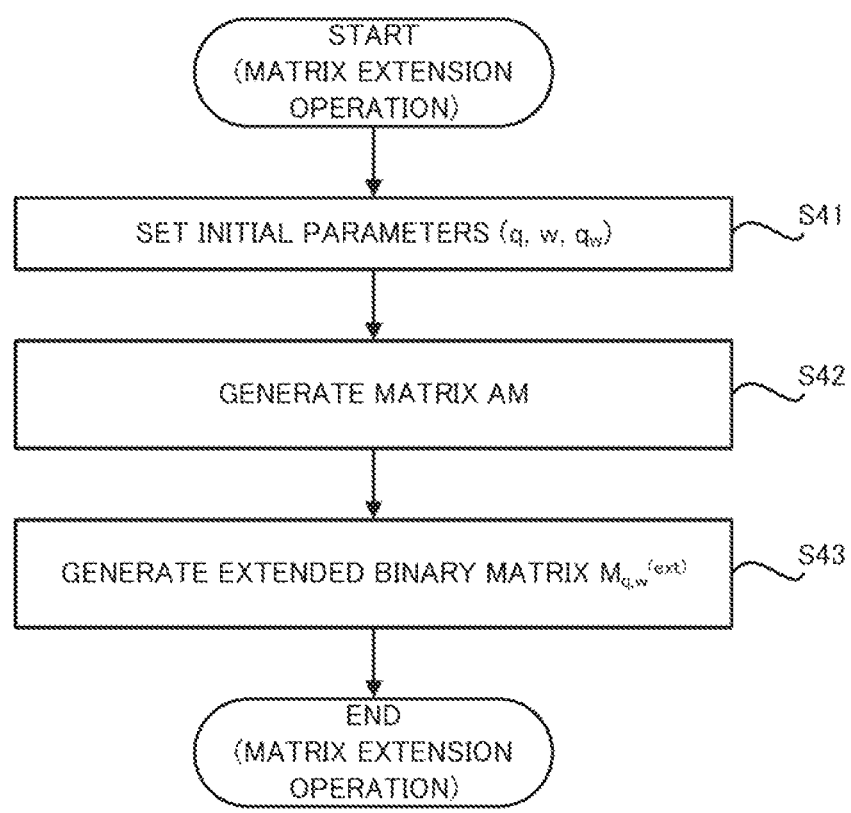
FIG. 14 is a flow chart that illustrates a flow of a matrix extension operation.

The matrix generation apparatus 4 may perform a matrix extension operation for extending the binary matrix $M_{q,w}$ generated by the above described matrix generation operation. an operation for "extending the binary matrix $M_{q,w}$" in the present example embodiment includes an operation for "extending the binary matrix M in the column direction (namely, adding one or more column vector to the binary matrix $M_{q,w}$)". Next, with reference to FIG. 14, the matrix extension operation will be described. FIG. 14 is a flowchart that illustrates a flow of the matrix extension operation.

As illustrated in FIG. 14, the matrix generation unit 411 set an initial parameter that is necessary for extending the binary matrix $M_{q,w}$ (a step S41). The initial parameter may include the exponentiation q and the integer w used by the above described matrix generation operation, for example. Incidentally, when the exponentiation q and the integer w have been already set by the matrix generation operation that have been performed before the matrix extension operation is performed, the matrix generation unit 411 may perform the matrix extension operation by using the exponentiation q and the integer w already set. Moreover in the matrix extension operation, the initial parameter may include a exponentiation $q_w$ of the prime number that is equal to or smaller than q/w and that is maximum. Note that there is a possibility that q/w is smaller than 2 depending on a value of each of the exponentiation q and the integer w. as a result, there is a possibility that there does not exist the exponentiation $q_w$ of the prime number that is equal to or smaller than q/w, that is smaller than 2, and that is maximum. In this case, the matrix generation unit 411 may set the exponentiation $q_w$ to be 0.

Then, the matrix generation unit 411 generates a matrix AM (a step S42). The matrix AM is a matrix illustrated in FIG. 15.

Figure 15:
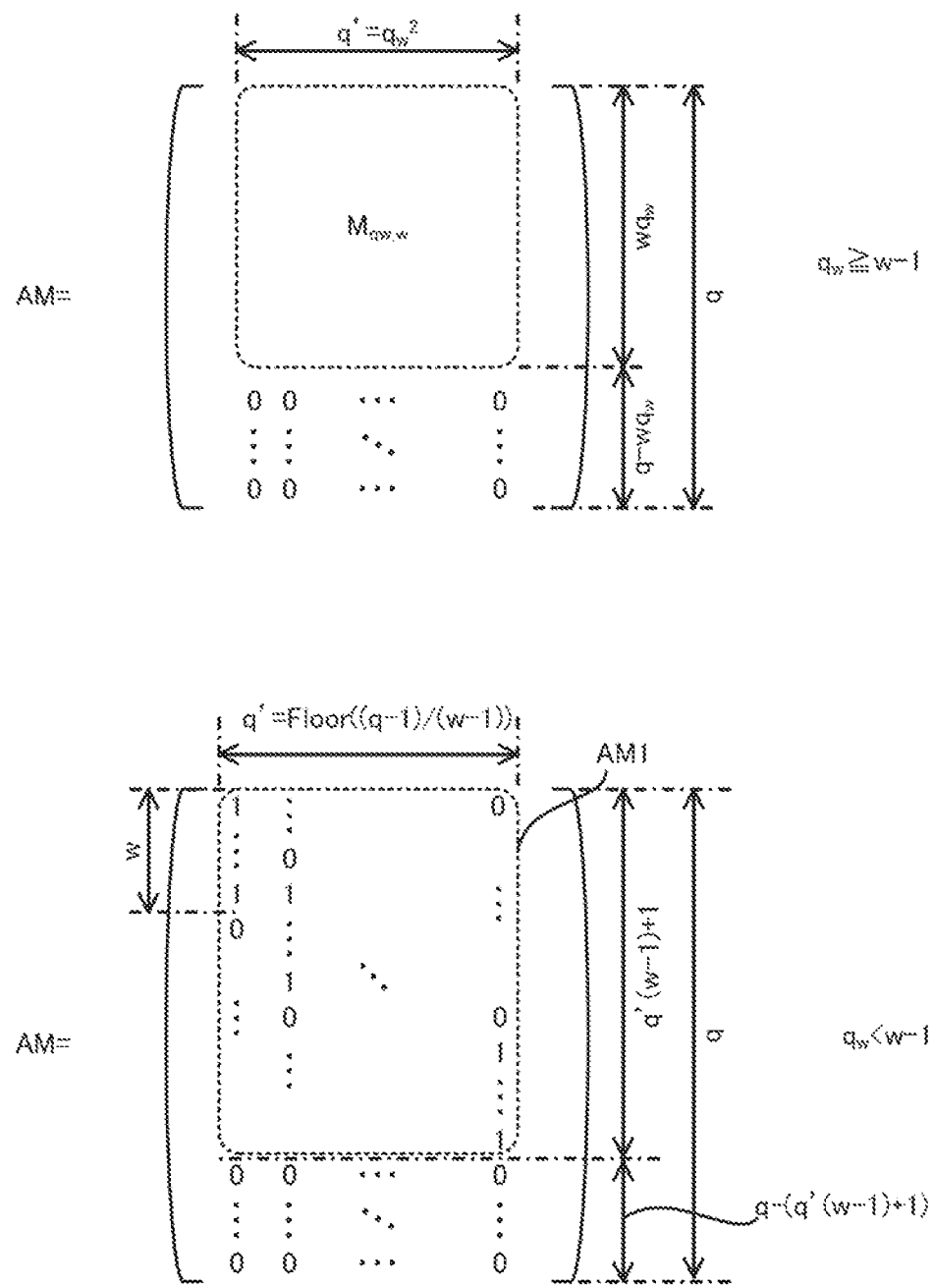
FIG. 15 illustrates a matrix that is used in a process of generating an extended binary matrix.

Specifically, as illustrated in FIG. 15, when the exponentiation $q_w$ is equal to or larger than w−1 (namely, $q_w \geq w-1$ is satisfied), the matrix generation unit 411 firstly generates the binary matrix $M_{q,w}$ having a size of $wq_w$ number of row×q' number of column by performing the above described matrix generation operation. Note that an variable number q' is a square of the exponentiation $q_w (=q_w^2)$ when $q_w \geq w-1$ is satisfied. Then, the matrix generation unit 411 adds q−$wq_w$ number of row vector in which all of elements are 0 to the generated binary matrix $M_{q,w}$. Note that an operation for adding q−$wq_w$ number of row vector in which all of elements are 0 to the binary matrix $M_{q,w}$ is equivalent to an operation for adding a matrix having a size of q−$wq_w$ number of row×$q_w^2$ number of column in which all of elements are 0 to the binary matrix $M_{q,w}$. As a result, the matrix AM having a size of q number of row×q' number of column.

On the other hand, when the exponentiation $q_w$ is not equal to or larger than w−1 (namely, $q_w < w-1$ is satisfied), the matrix generation unit 411 generates a matrix AM1 having a size of (q'(w−1)+1) number of row×$q_w^2$ number of column by arranging, along the row direction, q' number of row vector each of which has q'(w−1)+1 number of elements in which w number of sequential elements are 1 and the residual element is 0 so that the number of an element that is 1 in both of any two column vectors is 1 at most. Incidentally, when $q_w < w-1$ is satisfied, the variable number q' is an integer that is equal to or smaller than (q−1)/(w−1) and that is maximum (in FIG. 15, it is represented as Floor ((q−1)/(w−1)) by using a window function Floor). Then, the matrix generation unit 411 adds q−(q'(w−1)+1) number of row vector in which all of elements are 0 to the generated matrix AM1. Note that an operation for adding q−(q'(w−1)+1) number of row vector in which all of elements are 0 to the matrix AM1 is equivalent to an operation for adding a matrix having a size of (q−(q'(w−1)+1)) number of row×q' number of column in which all of elements are 0 to the matrix AM. As a result, the matrix AM having a size of q number of row×q' number of column.

Figure 16:
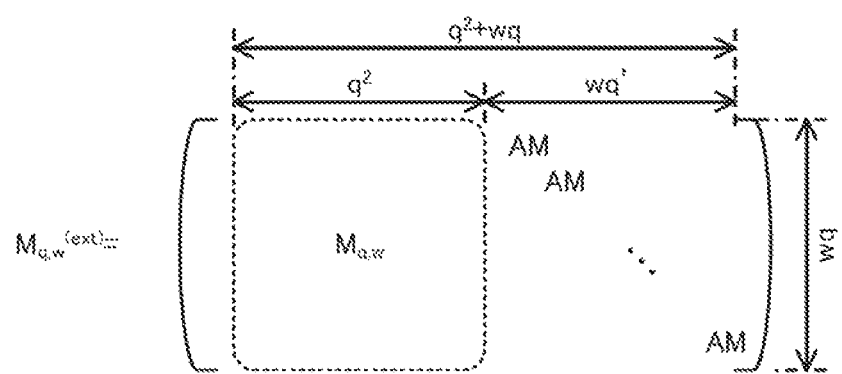
FIG. 16 illustrates the extended binary matrix.

Then, the matrix generation unit 411 generates the extended binary matrix $M_{q,w}^{(ext)}$ by adding, to the binary matrix $M_{q,w}$ generated by a matrix generation method, a block matrix in which w number of matrixes AM generated at the step S42 are arranged in a diagonal pattern (a step S43). Namely, the matrix generation unit 411 sets a matrix that is obtained by adding the block matrix in which w number of matrixes AM arranged in a diagonal pattern to the binary matrix $M_{q,w}$ to be the extended binary matrix $M_{q,w}^{(ext)}$ (the step S43). Note that the extended binary matrix $M_{q,w}^{(ext)}$ is a matrix illustrated in FIG. 16.

The extended binary matrix $M_{q,w}^{(ext)}$ generated in this manner is a matrix that satisfies the above described first to third matrix conditions, as with the binary matrix $M_{q,w}$. Therefore, even when the extended binary matrix $M_{q,w}^{(ext)}$ is used, an effect that is same as the effect achieved when the binary matrix $M_{q,w}$ is used can be achieved. Furthermore, the number of the column of the extended binary matrix $M_{q,w}^{(ext)}$ is different from the number of the column of the binary matrix $M_{q,w}$. As a result, it is possible to change the number n of the column of the binary matrix having the size of t number of row×n number of column. Thus, a type of the bit length n of the bit stream Y ($y_0, y_1, \ldots, y_n 1$) that is allowed to be processed by using the binary matrix M increases. Namely, a freedom of the bit length n improves. Especially, the number of the column of the extended binary matrix $M_{q,w}^{(ext)}$ is larger than the number of the column of the binary matrix $M_{q,w}$. As a result, the number n of the column of the binary matrix having the size of t number of row×n number of column is relatively 8 large. Thus, the bit length n of the bit stream Y ($y_0, y_1, \ldots, y_{n-1}$) that is allowed to be processed by using the binary matrix M is relatively long. Namely, a relatively long bit length n is usable.

<3> Specific Example

Next, the transmission operation, the reception operation, the learning operation, the matrix generation operation and the matrix extension operation in a situation where a specific number is applied to each variable number described above (for example, the variable numbers b, n, t, w and q) will be described. In the below described description, the transmission operation, the reception operation, the learning operation, the matrix generation operation and the matrix extension operation in a situation where a specific number is applied to each variable number described above (for example, the variable numbers b, n, t, w and q) will be described by using the communication system SYS using a 64 QAM method.

When, the 64QAM method is used, the communication system SYS transmits the transmission data by a unit of 6 bits. Thus, the data conversion unit 111 of the transmission apparatus 1 divides the bit stream $A=(a_0, a_1, \ldots)$ representing the transmission data into the bit stream $Z=(z_0, z_1, \ldots, z_5)$ the bit length of which is 6. Namely, when the 64QAM method is used, the variable length b is set to be 6.

Then, the data conversion unit 111 converts each bit stream $Z=(z_0, z_1, \ldots, z_5)$ into the bit stream $Y=(y_0, y_1, \ldots, y_{n-1})$. In the below described description, an example in which the bit stream Y is an one hot vector (namely, an example in which the integer w=2) will be described for the simple description. In this case, the bit length n of the bit stream Y is $2^6=64$. Therefore, the data conversion unit 111 converts each bit stream $Z=(z_0, z_1, \ldots, z_5)$ into the bit stream $Y=(y_0, y_1, \ldots, y_{63})$.

Then, the input layer processing unit 112 converts the bit stream $Y=(y_0, y_1, \ldots, y_{63})$ into the bit stream $X=(x_0, x_1, \ldots, x_{t-1})$ by using the binary matrix $M_{q,w}$. As described above, the number t of the row and the number n of the column of the binary matrix $M_{q,w}$ satisfies such a condition that $t=w \times q$ and $n=q^2$ as described above. Thus, since n=64, the matrix generation unit 411 sets the variable number q corresponding to the initial parameter to be 8 that is a square root of the n=64 in generating the binary matrix $M_{q,w}$. 8 is an exponentiation of the prime number 2, and thus, it can be set to be the variable number q (namely, the exponentiation q). moreover, since the integer w is set to be 2 as described above, the variable number t (namely, the bit length of the bit stream X) is $2 \times 8=16$, and the binary matrix $M_{8,2}$ is used to generate the bit stream X.

In order to generate the binary matrix $M_{8,2}$, the matrix generation unit 411 sets the primitive element β corresponding to the initial parameter to be a primitive element β of a finite field in which an order is $q^2=64$ (a primitive polynomial is $x^6+x+1$, for example), in addition to the variable number q (the exponentiation q) and the variable number w (the integer w) corresponding to the above described initial parameter. Then, the matrix generation unit 411 generates the binary matrix $M_{8,2}$ based on the flowchart illustrated in FIG. 9. As a result, the binary matrix $M_{8,2}$ having a size of 16 columns×64 rows illustrated in FIG. 17.

Figure 17:
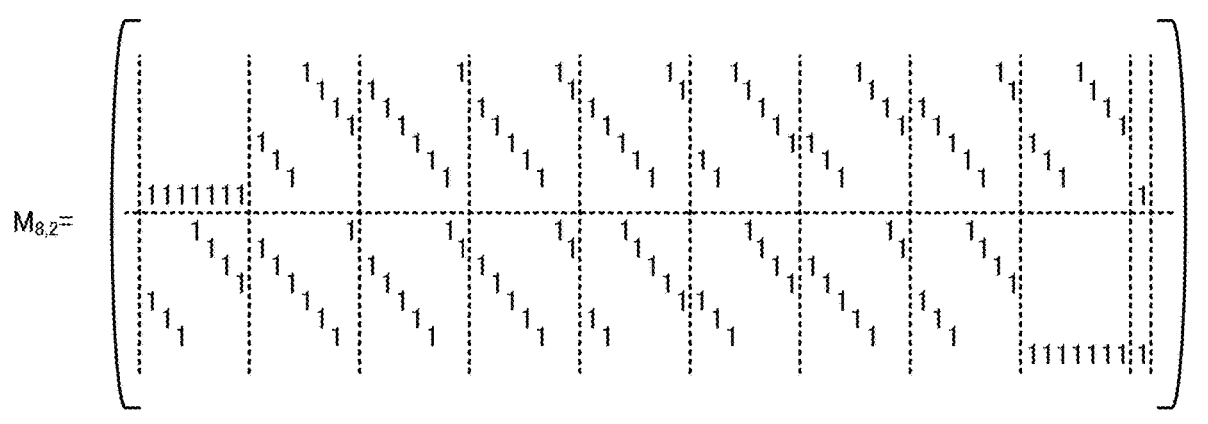

The input layer processing unit 112 converts the bit stream $Y=(y_0, y_1, \ldots, y_{63})$ into the bit stream $X=(x_0, x_1, \ldots, x_{15})$ by using the binary matrix $M_{8,2}$ illustrated in FIG. 17. Here, since the bit stream Y is the one hot vector, the bit stream X is a bit stream in which the weight (namely, the number of bit) is 2.

Then, the bit stream $X=(x_0, x_1, \ldots, x_{15})$ is inputted into the Neural Network 113. Thus, the Neural Network 113 includes 16 input nodes. Here, if the bit stream $Y=(y_0, y_1, \ldots, y_{63})$ is inputted into the Neural Network 113, the Neural Network 113 should include 64 input nodes. As a result, the number of the hidden node of the Neural Network 113 is also relatively large. However, in the present example embodiment, the number of the input node of the Neural Network 113 can be reduced by 16/64=¼ times. Therefore, it turns out that an effect of a reduction of the size of the Neural Network 113 by the present example embodiment is large. Therefore, it turns out that the effect of the reduction of the processing load of the communication system SYS is also large.

Note that the effect of the reduction of the Neural Network 113 is more remarkable as the bit length b of the bit stream $Z=(z_0, z_1, \ldots, z_{b-1})$ and the bit length n of the bit stream $Y=(y_0, y_1, \ldots, y_{n-1})$ are longer. For example, when the communication system SYS uses a 1024 QAM method, the communication system SYS transmits the transmission data by a unit of 10 bits. The data conversion unit 111 converts the bit stream $Z=(z_0, z_1, \ldots, z_9)$ the bit length of which is 10 into the bit stream $Y=(y_0, y_1, \ldots, y_{1023})$ the bit length of which is 2^10=1024. In this case, the input layer processing unit 112 converts the bit stream $Y=(y_0, y_1, \ldots, y_{1023})$ into the bit stream $X=(x_0, x_1, \ldots, x_{32w-1})$ by using the binary matrix $M_{32,w}$ having a size of 32 number of row× 1024 number of column. Thus, the number of the input node of the Neural Network 113 can be reduced by 32w/1024=w/32 times. Since the minimum value of the integer w is 2, the number of the input node of the Neural Network 113 can be reduced up to ¹⁄₁₆ times.

Then, the transmission apparatus 1 transmits the transmission signal Tx having the feature represented by the index value outputted from the Neural Network 113 to the reception apparatus 2 through the communication line 3.

Then, the reception apparatus 2 receives, as the reception signal Rx, the transmission signal Tx transmitted by the transmission apparatus 1 through the communication line 3. Then, the reception signal processing unit 211 extracts the feature of the reception signal Rx received at the step S21 (the step S22). Here, there is a possibility that the extracted feature of the reception signal Rx is different from the feature of the transmission signal Tx (namely 8, the feature represented by the index value outputted from the Neural Network 113). This is because there is a possibility that the reception signal Rx is affected by the disturbance in the communication line 3.

Then, the Neural Network 212 outputs the numerical data stream U. Specifically, the Neural Network 212 outputs 16 numerical data $(u_0, u_1, \ldots, u_{15})$, which constitutes the numerical data stream U, from 16 output nodes, respectively. Here, if the bit stream $Y=(y_0, y_1, \ldots, y_{63})$ the length of which is 64 is inputted into the Neural Network 113 of the transmission apparatus 1, the Neural Network 212 of the reception apparatus 2 corresponding to the Neural Network 113 also outputs the numerical data stream U including 64 numerical data $(u_0, u_1, \ldots, u_{63})$. In this case, the Neural Network 212 should include 64 output nodes. As a result, the number of the hidden node of the Neural Network 212 is also relatively large. Therefore, it turns out that an effect of a reduction of the size of the Neural Network 212 by the present example embodiment is large. Therefore, as described above, it turns out that the effect of the reduction of the processing load of the communication system SYS is also large. Moreover, when the communication system SYS uses the 1024 QAM method as described above, the number of the output node of the Neural Network 212 can be reduced up to ¹⁄₁₆ times, as with the number of the input node of the Neural Network 113.

The numerical data stream $U=(u_0, u_1, \ldots, u_{15})$ may be normalized by a sigmoid function so that $0 \leq u_0, u_1, \ldots, u_{15} \leq 1$ is satisfied. In this case, the numerical data stream $U=(u_0, u_1, \ldots, u_{15})$ outputted from the Neural Network 212 corresponds to the bit stream $X=(x_0, x_1, \ldots, x_{15})$ inputted into the Neural Network 113. Thus, the parameters of the Neural Networks 113 and 212 are learned by the above described learning operation so that 16 numerical data ($u_0$, $u_1$, ..., $u_{15}$) are equal to (or have values relatively close to) 16 bits ($x_0$, $x_1$, ..., $x_{15}$), respectively. As a result, the Neural Network 212 is expected to output the numerical data ($u_0$, $u_1$, ..., $u_{15}$) that are equal to (or have values relatively close to) 16 bits ($x_0$, $x_1$, ..., $x_{15}$), respectively. Namely, the Neural Network 212 is expected to output the numerical data stream U that satisfies $x_i=u_i$ (i=0, 1, ..., 63).

Then, the output layer processing unit 213 converts the numerical data stream U=($u_0$, $u_1$, ..., $u_{15}$) g into the numerical data stream Y' including 64 numerical data ($y'_0$, $y'_1$, ..., $y'_{63}$). The numerical data stream Y'=($y'_0$, $y'_1$, ..., $y'_{63}$) outputted from the output layer processing unit 213 corresponds to the bit stream Y=($y_0$, $y_1$, ..., $y_{63}$) inputted into the input layer processing unit 112. Thus, the parameters of the Neural Networks 113 and 212 are learned by the above described learning operation so that 64 numerical data ($y'_0$, $y'_1$, ..., $y'_{63}$) are equal to (or have values relatively close to) 64 bits ($y_0$, $y_1$, ..., $y_{63}$), respectively. As a result, the output layer processing unit 213 is expected to output the numerical data ($y'_0$, $y'_1$, ..., $y'_{63}$) that are equal to (or have values relatively close to) 64 bits ($y_0$, $y_1$, ..., $y_{63}$), respectively. Namely, the output layer processing unit 213 is expected to output the numerical data stream Y' that satisfies y'i=$y_i$ (i=0, 1, ..., 63).

Then, the data conversion unit 214 converts the numerical data stream Y'=($y'_0$, $y'_1$, ..., $y'_{63}$) into the bit stream Z'=($z'_0$, $z'_1$, ..., $z'_5$). The bit stream Z'=($z'_0$, $z'_1$, ..., $z'_5$) outputted from the data conversion unit 214 corresponds to the bit stream Z=($z_0$, $z_1$, ..., $z_5$) that is obtained by dividing the transmission data. Thus, the parameters of the Neural Networks 113 and 212 are learned by the above described learning operation so that 6 bits ($z'_0$, $z'_1$, ..., $z'_5$) are equal to 6 bits ($z_0$, $z_1$, ..., $z_5$), respectively. As a result, the data conversion unit 214 is expected to output the bits ($z'_0$, $z'_1$, ..., $z'_5$) that are equal to the bits ($z_0$, $z_1$, ..., $z_5$), respectively. Namely, the data conversion unit 214 is expected to output the bit stream Z' that satisfies $z_i=z_i$ (i=0, 1, ..., 5).

Figure 18:
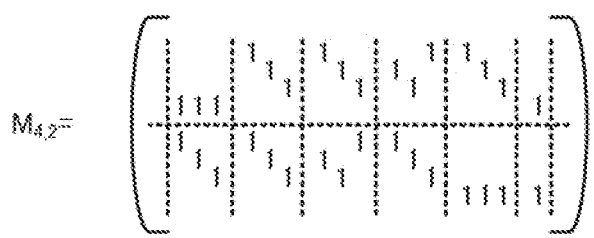
FIG. 18 illustrates a matrix that is used in a process of generating the extended binary matrix.

In the above described description, the communication system SYS uses the binary matrix $M_{8,2}$ having the size of 16 rows×64 columns, however, the communication system SYS may use the extension binary matrix $M_{8,2}^{(ext)}$. Specifically, the exponentiation $q_w$ of the prime number that is equal to or smaller than q/w and that is maximum is 4 (=2^2), because q/w=8/2=4. In this case, $q_w$ (=4)≥w−1 (=1) is satisfied, and thus, the matrix generation unit 411 generates the matrix AM illustrated in upper part of FIG. 15. Specifically, the matrix generation unit 411 generates the binary matrix $M_{qw,w}=M_{4,2}$. In this case, a primitive element of a finite field in which an order is 4^2=16 (a primitive polynomial is $x^4+x+1$, for example) may be used as the primitive element β. The binary matrix $M_{4,2}$ is a matrix illustrated in FIG. 18. Then, the matrix generation unit 411 adds q−wq_w number of row vector in which all of elements are 0 to the generated binary matrix $M_{4,2}$. However, in this example, q−wq_w=8−2×4=0, and thus, the matrix AM is same as the binary matrix $M_{4,2}$ having the size of 8 rows×16 columns. Then, the matrix generation unit 411 generates the extended binary matrix $M_{8,2}^{(ext)}$ having the size of 16 rows×96 columns by adding, to the binary matrix $M_{8,2}$, a block matrix in which two binary matrixes $M_{4,2}$ corresponding to the matrixes AM are arranged in a diagonal pattern. The extension binary matrix $M_{8,2}^{(ext)}$ is a matrix illustrated in FIG. 19.

In this case, the input layer processing unit 112 is capable of converting the bit stream Y having the bit length 96 into the bit stream X having the bit length 16. Thus, the number of the input node of the Neural Network 113 can be reduced by 16/96=⅙ times. Therefore, the effect of the reduction of the size of the Neural Network 113 (furthermore, the Neural Network 212) is larger by using the extended binary matrix $M_{8,2}^{(ext)}$, and as a result, the effect of the reduction of the processing load is also larger. Furthermore, as described above, the freedom of the bit length n improves by using the extended binary matrix $M_{8,2}^{(ext)}$. Namely, the input layer processing unit 112 is capable of converting the bit stream Y into the bit stream X so that the bit length is shorter by a ratio having a relatively large freedom.

Figure 19:
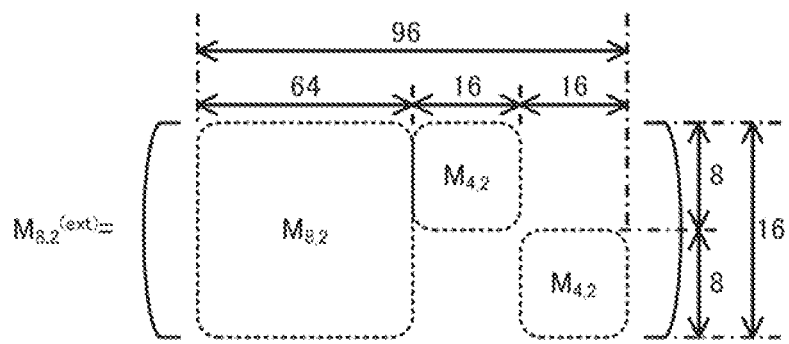
FIG. 19 illustrates the extended binary matrix.
Figure 20:
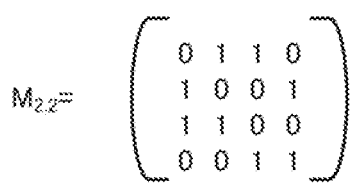
FIG. 20 illustrates a matrix that is used in a process of generating the extended binary matrix.
Figure 21:
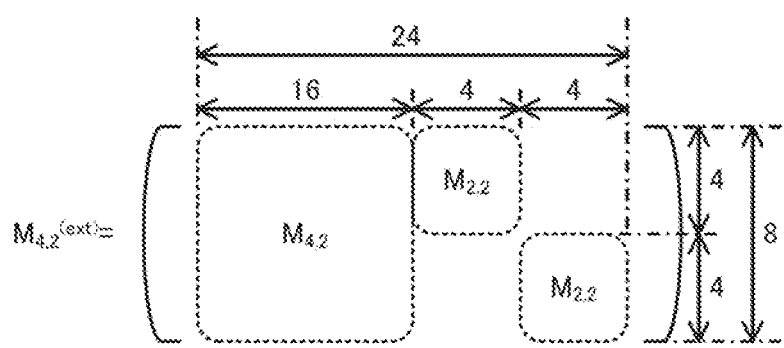
FIG. 21 illustrates the extended binary matrix.
Figure 22:
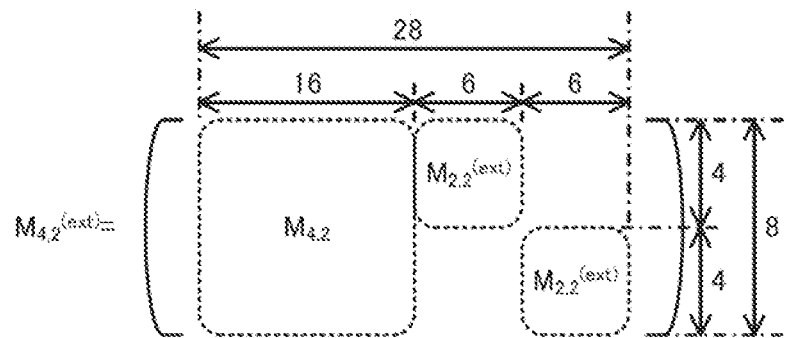
FIG. 22 illustrates the extended binary matrix.
Figure 23:
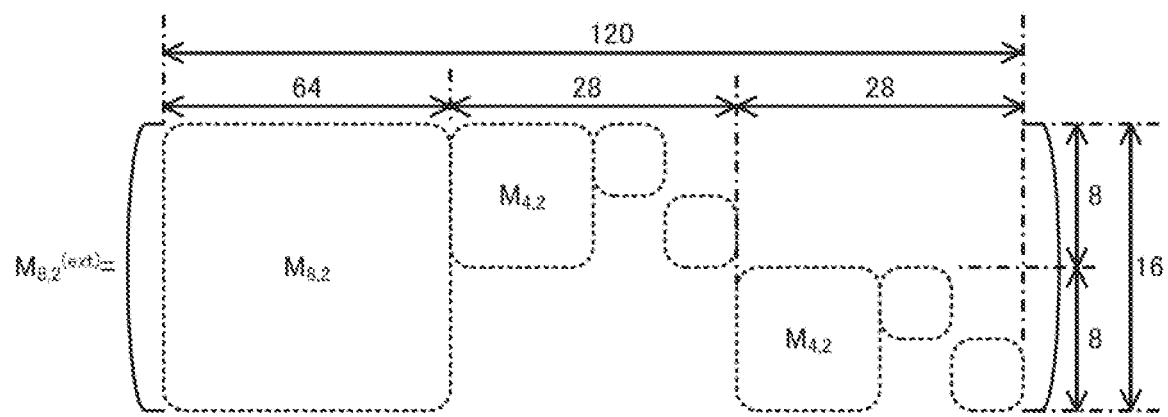
FIG. 23 illustrates the extended binary matrix.

The matrix extension operation may be performed repeatedly in some case. For example, as illustrated in FIG. 19, the extended binary matrix $M_{8,2}^{(ext)}$ includes the binary matrix $M_{4,2}$. Thus, the matrix generation unit 411 may further extend the extended binary matrix $M_{8,2}^{(ext)}$ by extending the binary matrix $M_{4,2}$ included in the extended binary matrix $M_{8,2}^{(ext)}$. Specifically, the matrix generation unit 411 firstly generates the extended binary matrix $M_{4,2}^{(ext)}$. The exponentiation $q_w$ of the prime number that is equal to or smaller than q/w and that is maximum is 2 (=2^1), because q/w=4/2=2. In this case, $q_w$(=2)≥w−1 (=1) is satisfied, and thus, the matrix generation unit 411 generates the matrix AM illustrated in upper part of FIG. 15. Specifically, the matrix generation unit 411 generates the binary matrix $M_{qw,w}=M_{2,2}$. In this case, a primitive element of a finite field in which an order is 2^2=4 (a primitive polynomial is $x^2+x+1$, for example) may be used as the primitive element β. The binary matrix $M_{2,2}$ is a matrix illustrated in FIG. 20. Then, the matrix generation unit 411 adds q−wq_w number of row vector in which all of elements are 0 to the generated binary matrix $M_{2,2}$. However, in this example, q−wq_w=2−2×2<0, and thus, the matrix AM is same as the binary matrix $M_{4,2}$ having the size of 4 rows×4 columns. Then, the matrix generation unit 411 generates the extended binary matrix $M_{4,2}^{(ext)}$ having the size of 8 rows×24 columns by adding, to the binary matrix $M_{4,2}$, a block matrix in which two binary matrixes $M_{2,2}$ corresponding to the matrixes AM are arranged in a diagonal pattern. The extension binary matrix $M_{4,2}^{(ext)}$ is a matrix illustrated in FIG. 21. Furthermore, the binary matrix $M_{2,2}$ included in the extension binary matrix $M_{4,2}^{(ext)}$ can be also extended. Therefore, the extension binary matrix $M_{4,2}^{(ext)}$ illustrated in FIG. 21 becomes a matrix illustrated in FIG. 22 by replacing the binary matrix $M_{2,2}$ by an extension binary matrix $M_{2,2}^{(ext)}$ having the size of 4 rows×6 columns that is obtained by extending the binary matrix $M_{2,2}$. As a result, the extension binary matrix $M_{8,2}^{(ext)}$ illustrated in FIG. 19 becomes a matrix illustrated in FIG. 23 by replacing the binary matrix $M_{4,2}$ by the extension binary matrix $M_{4,2}^{(ext)}$ having the size of 8 rows×28 columns. Specifically, the extension binary matrix $M_{8,2}^{(ext)}$ having the size of 16 rows×120 columns is generated. Namely, the extension binary matrix $M_{8,2}^{(ext)}$ the number of the row of which is 120/64≈1.875 times of that of the original binary matrix $M_{8,2}$.

In this case, the input layer processing unit 112 is capable of converting the bit stream Y having the bit length 120 into the bit stream X having the bit length 16. Thus, the number of the input node of the Neural Network 113 can be reduced by 16/120=2/15 times. Therefore, the effect of the reduction of the size of the Neural Network 113 (furthermore, the Neural Network 212) is larger by using the extended binary matrix $M_{8,2}^{(ext)}$, and as a result, the effect of the reduction of the processing load is also larger. Furthermore, the freedom of the bit length n improves by using the extended binary matrix $M_{8,2}^{(ext)}$. Namely, the input layer processing unit 112 is capable of converting the bit stream Y into the bit stream X so that the bit length is shorter by a ratio having a relatively large freedom.

Moreover, even when the communication system SYS uses the 1024QAM method, the extension binary matrix M having the size of 81 rows×1053 columns may be generated by extending the binary matrix $M_{32,w}$. This extension binary matrix M may include the binary matrix $M_{27,3}$ having the size of 81 rows×729 columns, the binary matrix $M_{9,3}$ having the size of 27 rows×81 columns, and the binary matrix $M_{3,3}$ having the size of 9 rows×9 columns. As a result, the number of the input node of the Neural Network 113 (furthermore, the number of the output node of the Neural Network 212) can be reduced by 81/1024 times. In this case, the communication system SYS has a same error robustness and is capable of reducing the size of the Neural Networks 113 and 212 more, compared to a case where the binary matrix $M_{32,w}$ is used in a situation where w=3.

<4> Modified Example of Communication System SYS

Figure 24:
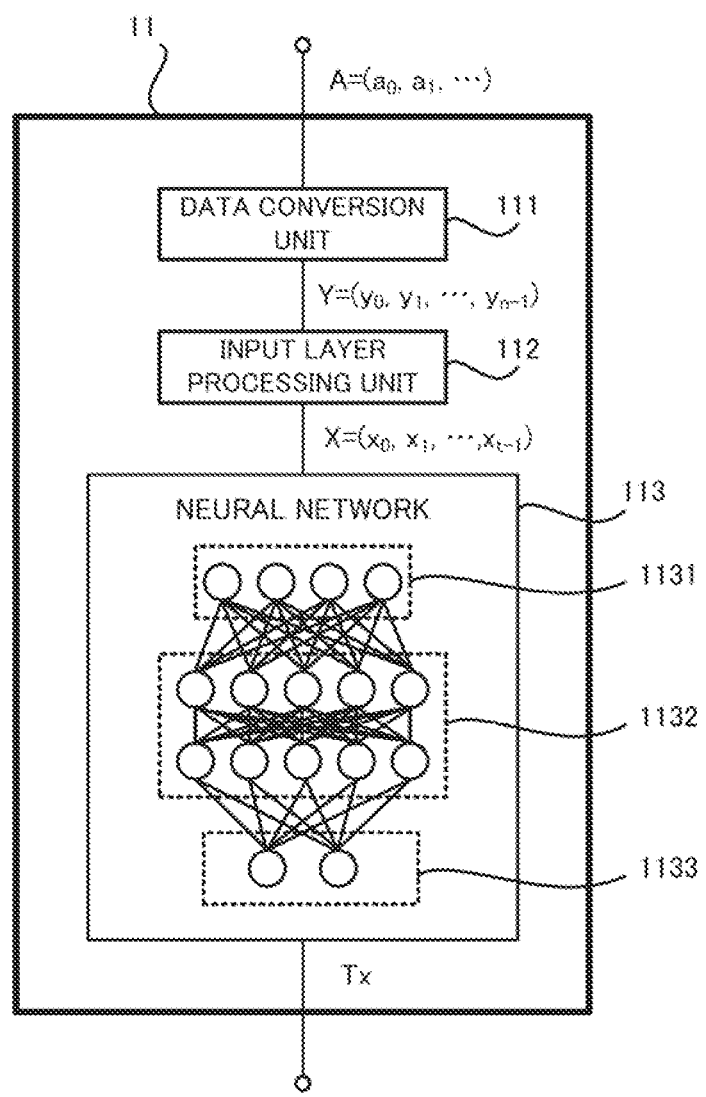
FIG. 24 is a block diagram that illustrates another example of a configuration of the logical functional blocks implemented in the arithmetic apparatus of the transmission apparatus in the present example embodiment.

In the above described description, the arithmetic apparatus 11 of the transmission apparatus 1 includes the transmission signal generation unit 114 that is configured to generate the transmission signal Tx based on the output of the Neural Network 113. However, the communication apparatus 13 may not include the transmission signal generation unit 114. In this case, as illustrated in FIG. 24, the arithmetic apparatus 11 may not include the transmission signal generation unit 114.

Figure 25:
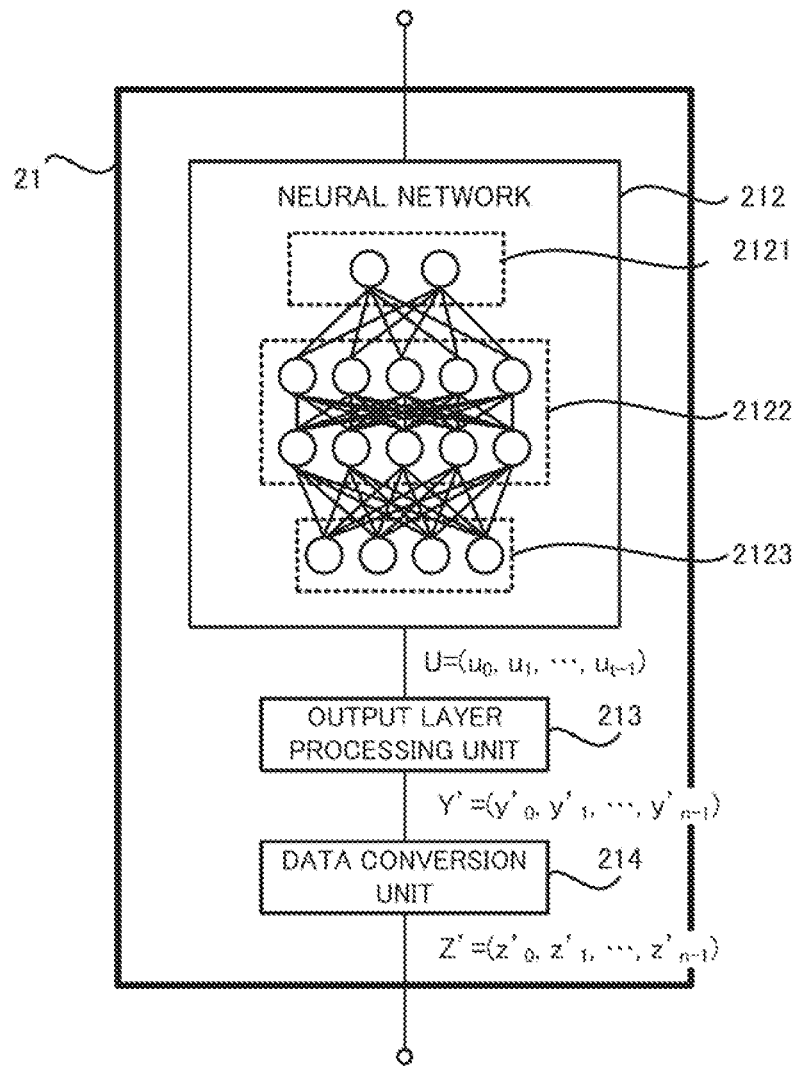
FIG. 25 is a block diagram that illustrates another example of a configuration of the logical functional blocks implemented in the arithmetic apparatus of the reception apparatus in the present example embodiment.

In the above described description, the arithmetic apparatus 21 of the reception apparatus 2 includes the reception signal processing unit 211 that is configured to extract the feature of the reception signal Rx. However, as illustrated in FIG. 25, the arithmetic apparatus 21 may not include the reception signal processing unit 211. In this case, the Neural Network 212 may extract the feature of the reception signal Rx.

In the above described description, the transmission apparatus 1 generates the transmission signal Tx by using the output of the Neural Network 113. However, the transmission apparatus 1 may generate the transmission signal Tx by using a learnable arithmetic model that is different from the Neural Network, instead of the Neural Network 113. Alternatively, the transmission apparatus 1 may generate the transmission signal Tx without using the output of the Neural Network 113. For example, the transmission apparatus 1 may include an index generation unit that is configured to generate, based on the bit stream X outputted from the input layer processing unit 112, an index value that is same as the index value outputted from the Neural Network 113. In this case, the transmission signal generation unit 114 may generate the transmission signal Tx based on the index value outputted from the index generation unit. Alternatively, for example, the transmission apparatus 1 may generate, based on the bit stream X outputted from the input layer processing unit 112, the transmission signal Tx that is same as the transmission signal Tx generated based on the output of the Neural Network 113. In this case, the transmission signal generation unit 114 may generate the transmission signal Tx based on the index value outputted from the index generation unit. In this case, the transmission apparatus 1 may not include the Neural Network 113.

In the above described description, the reception apparatus 2 estimates transmission signal Tx from the reception signal Rx by using the output of the Neural Network 212. However, the reception apparatus 2 may estimate transmission signal Tx from the reception signal Rx by using a learnable arithmetic model that is different from the Neural Network, instead of the Neural Network 212. Alternatively, the reception apparatus 2 may estimate the transmission signal Tx without using the output of the Neural Network 212. For example, the reception apparatus 2 may include a data generation unit that is configured to generate, based on the feature of the reception signal Rx outputted from the reception signal processing unit 211, a numerical data stream that is same as the numerical data stream U outputted from the Neural Network 212. In this case, the output layer processing unit 213 may convert the numerical data stream outputted from the data generation unit into the numerical data stream Y'. In this case, the reception apparatus 2 may not include the Neural Network 212.

In the above described description, the matrix generation apparatus 4 is an apparatus that is independent from the communication system SYS. However, the matrix generation apparatus 4 may be an apparatus that is provided by the communication system SYS. Namely, the communication system SYS may include the matrix generation apparatus 4. Moreover, the transmission apparatus 1 may include the matrix generation apparatus 4. Namely, the matrix generation unit 411 for generating the binary matrix M may be implemented in the arithmetic apparatus 11 of the transmission apparatus 1. Moreover, the reception apparatus 2 may include the matrix generation apparatus 4. Namely, the matrix generation unit 411 for generating the binary matrix M may be implemented in the arithmetic apparatus 21 of the reception apparatus 2.

In the above described description, the binary matrix M generated by the matrix generation apparatus 4 is used by the communication system SYS. Namely, the binary matrix M is used by the transmission apparatus 1 for transmitting the transmission signal Tx and Rx for receiving the reception signal Rx. However, the binary matrix M may be used for a usage that is different from the communication. For example, the binary matrix M may be used for a usage of Group Testing described in the Non-Patent Literature 5.

<5> Supplementary Note

With respect to the example embodiments described above, the following Supplementary Notes will be further disclosed.

Supplementary Note 1

A communication system including:
a transmission apparatus that is configured to transmit a transmission signal through a communication line; and
a reception apparatus that is configured to receive, as a reception signal, the transmission signal transmitted by the transmission apparatus through the communication line,
wherein
the transmission apparatus includes:
a first bit conversion unit that is configured to convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;

a second bit conversion unit that is configured to convert the second bit stream into a third bit stream having a third bit length t that is shorter than the second bit stream n; and a Neural Network that has an input node the number of which is equal to the third bit length t and that is configured to output an index value designating a feature of the transmission signal when the third bit stream is inputted thereto, the reception apparatus includes:

a Neural Network that has an output node the number of which is equal to the third bit length t and that is configured to output a first numerical data stream including numerical data the number of which is equal to the third bit length t when a feature of the reception signal is inputted thereto;

a numerical conversion unit that is configured to convert the first numerical data stream into a second numerical data stream including numerical data the number of which is equal to the second bit length n; and a generation unit that is configured to generate a fourth bit stream having the first bit length b by performing, on the second numerical data stream, a conversion processing that corresponds to an inverse conversion of a conversion processing performed by the first bit conversion unit.

Supplementary Note 2

The communication system according to Supplementary Note 1, wherein the second bit conversion unit is configured to convert the second bit stream into the third bit stream by using a binary matrix having a size of t number of row×n number of column.

Supplementary Note 3

The communication system according to Supplementary Note 2, wherein the second bit conversion unit is configured to designate, based on the bit position of the w−1 number of bit 1 included in the second bit stream, w−1 number of column vector from the binary matrix, and to set t number of element included in a logical OR of w−1 number of the column vector to be the third bit stream.

Supplementary Note 4

The communication system according to any one of Supplementary Notes 1 to 3, wherein the numerical conversion unit is configured to convert the first numerical data stream into the second numerical data stream by using a binary matrix having a size of t number of row×n number of column.

Supplementary Note 5

The communication system according to Supplementary Note 4, wherein the numerical conversion unit is configured to calculate a n-dimensional row vector by multiplying the binary matrix with a t-dimensional row vector including t number of numerical data included in the first numerical data stream, and to calculate n number of numerical data that is to be included in the second numerical data stream by dividing each element of the n-dimensional row vector by the number of an element that is 1 in each column vector of the binary matrix.

Supplementary Note 6

The communication system according to any one of Supplementary Notes 2 to 5, wherein the binary matrix is a matrix in which the number of an element that is 1 in each column vector is equal to or larger than w and the number of an element that is 1 in both of two column vectors is 1 at most.

Supplementary Note 7

The communication system according to any one of Supplementary Notes 2 to 6, wherein the binary matrix is generated by a matrix generation method, the binary matrix generation method includes:

generating q+w number of first matrixes each of which has one element that is 1 in each column vector and each of which has a size of q (wherein, q is an exponentiation of a prime number) number of row×(q−1) number of column;

generating a second matrix that has q+w number of the first matrixes as elements and that has a size of wq number of row×(q²−1) number of column; and setting, as the binary matrix, a third matrix that is obtained by adding a column vector having w number of elements that are 1 into the second matrix.

Supplementary Note 8

The communication system according to Supplementary Note 7, wherein the binary matrix is generated by an extended matrix generation method, the extended matrix generation method includes:

generating a fourth matrix that is a binary matrix having a size of $wq_w$ number of rows×q' (wherein, $q'=q_w^2$) number of column by the matrix generation method, and generating a fifth matrix having a size of q number of row×q' number of column by adding $q-wq_w$ number of row vector in each of which all elements are 0 to the fourth matrix, when an exponentiation $q_w$ of the prime number that is equal to or smaller than q/w and that is maximum is equal to or larger than w−1;

generating a sixth matrix having a size of q number of row×q' number of column by arranging q' (wherein, q' is a maximum integer that is equal to or smaller than (q−1)(w−1)) number of column vector in each of which w number of sequential elements are 1 and a residual element is 0 so that the number of an element that is 1 in both of any two column vectors is 1 at most, when the exponentiation $q_w$ is not equal to or larger than w−1; and setting, as the binary matrix, a seventh matrix that is obtained by adding a block matrix in which w number of fifth matrixes or sixth matrixes are arranged in a diagonal pattern into the third matrix.

Supplementary Note 9

A transmission apparatus that is configured to transmit a transmission signal through a communication line, wherein the transmission apparatus includes:

a first bit conversion unit that is configured to convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
a second bit conversion unit that is configured to convert the second bit stream into a third bit stream having a third bit length t that is shorter than the second bit stream n; and
a Neural Network that has an input node the number of which is equal to the third bit length t and that is configured to output an index value designating a feature of the transmission signal when the third bit stream is inputted thereto.

Supplementary Note 10

A reception apparatus that is configured to receive, as a reception signal, a transmission signal transmitted by a transmission apparatus through a communication line, wherein
the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream,
the reception apparatus includes:
a Neural Network that has an output node the number of which is equal to the third bit length t and that is configured to output a first numerical data stream including numerical data the number of which is equal to the third bit length t when a feature of the reception signal is inputted thereto;
a numerical conversion unit that is configured to convert the first numerical data stream into a second numerical data stream including numerical data the number of which is equal to the second bit length n; and
a generation unit that is configured to generate a fourth bit stream having the first bit length b by performing, on the second numerical data stream, a conversion processing that corresponds to an inverse conversion of a conversion processing for converting the first bit stream into the second bit stream.

Supplementary Note 11

A binary matrix generation apparatus that is configured to generate a binary matrix, wherein
the binary matrix generation apparatus is configured to:
generate q+w (wherein, w is an integer that is equal to or larger than 2) number of first matrixes each of which has one element that is 1 in each column vector and each of which has a size of q (wherein, q is an exponentiation of a prime number) number of row×(q−1) number of column;
generate a second matrix that has q+w number of the first matrixes as elements and that has a size of wq number of row×(q²−1) number of column; and
set, as the binary matrix, a third matrix that is obtained by adding a column vector having w number of elements that are 1 into the second matrix.

Supplementary Note 12

The binary matrix generation apparatus according to Supplementary Note 11, wherein
the binary matrix is used at least one of a transmission apparatus that is configured to transmit a transmission signal through a communication line and a reception apparatus that is configured to receive, as a reception signal, the transmission signal transmitted by the transmission apparatus through the communication line.

Supplementary Note 13

A communication method using a transmission apparatus that is configured to transmit a transmission signal through a communication line and reception apparatus that is configured to receive, as a reception signal, the transmission signal transmitted by the transmission apparatus through the communication line, wherein
the communication method includes:
converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
converting the second bit stream into a third bit stream having a third bit length t that is shorter than the second bit stream n;
generating the transmission signal by using a Neural Network that has an input node the number of which is equal to the third bit length t and that is configured to output an index value designating a feature of the transmission signal when the third bit stream is inputted thereto;
inputting the reception signal into a Neural Network that has an output node the number of which is equal to the third bit length t and that is configured to output a first numerical data stream including numerical data the number of which is equal to the third bit length t when a feature of the reception signal is inputted thereto;
converting the first numerical data stream into a second numerical data stream including numerical data the number of which is equal to the second bit length n; and
generating a fourth bit stream having the first bit length b by performing, on the second numerical data stream, a conversion processing that corresponds to an inverse conversion of a conversion processing performed by the first bit conversion unit.

Supplementary Note 41

A transmission method of transmitting a transmission signal through a communication line, wherein
the transmission method includes:
converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
converting the second bit stream into a third bit stream having a third bit length t that is shorter than the second bit stream n; and
generating the transmission signal by using a Neural Network that has an input node the number of which is equal to the third bit length t and that is configured to output an index value designating a feature of the transmission signal when the third bit stream is inputted thereto.

Supplementary Note 15

A reception method of receiving, as a reception signal, a transmission signal transmitted by a transmission apparatus through a communication line,
wherein
the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream,
the reception method includes:
inputting the reception signal into a Neural Network that has an output node the number of which is equal to the third bit length t and that is configured to output a first numerical data stream including numerical data the number of which is equal to the third bit length t when a feature of the reception signal is inputted thereto;
converting the first numerical data stream into a second numerical data stream including numerical data the number of which is equal to the second bit length n; and
generating a fourth bit stream having the first bit length b by performing, on the second numerical data stream, a conversion processing that corresponds to an inverse conversion of a conversion processing for converting the first bit stream into the second bit stream.

Supplementary Note 16

A binary matrix generation method of generating a binary matrix, wherein
the binary matrix generation method includes:
generating q+w (wherein, w is an integer that is equal to or larger than 2) number of first matrixes each of which has one element that is 1 in each column vector and each of which has a size of q (wherein, q is an exponentiation of a prime number) number of row×(q−1) number of column;
generating a second matrix that has q+w number of the first matrixes as elements and that has a size of wq number of row×($q^2$−1) number of column; and setting, as the binary matrix, a third matrix that is obtained by adding a column vector having w number of elements that are 1 into the second matrix.

Supplementary Note 17

A recording medium on which a computer program that allows a computer to execute a communication method using a transmission apparatus that is configured to transmit a transmission signal through a communication line and reception apparatus that is configured to receive, as a reception signal, the transmission signal transmitted by the transmission apparatus through the communication line is recorded, wherein the communication method includes:
converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
converting the second bit stream into a third bit stream having a third bit length t that is shorter than the second bit stream n;
generating the transmission signal by using a Neural Network that has an input node the number of which is equal to the third bit length t and that is configured to output an index value designating a feature of the transmission signal when the third bit stream is inputted thereto;
inputting the reception signal into a Neural Network that has an output node the number of which is equal to the third bit length t and that is configured to output a first numerical data stream including numerical data the number of which is equal to the third bit length t when a feature of the reception signal is inputted thereto;
converting the first numerical data stream into a second numerical data stream including numerical data the number of which is equal to the second bit length n; and
generating a fourth bit stream having the first bit length b by performing, on the second numerical data stream, a conversion processing that corresponds to an inverse conversion of a conversion processing performed by the first bit conversion unit.

Supplementary Note 18

A recording medium on which a computer program that allows a computer to execute a transmission method of transmitting a transmission signal through a communication line is recorded, wherein
the transmission method includes:
converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
converting the second bit stream into a third bit stream having a third bit length t that is shorter than the second bit stream n; and
generating the transmission signal by using a Neural Network that has an input node the number of which is equal to the third bit length t and that is configured to output an index value designating a feature of the transmission signal when the third bit stream is inputted thereto.

Supplementary Note 19

A recording medium on which a computer program that allows a computer to execute a reception method of receiving, as a reception signal, a transmission signal transmitted by a transmission apparatus through a communication line is recorded, wherein
the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream, the reception method includes:

inputting the reception signal into a Neural Network that has an output node the number of which is equal to the third bit length t and that is configured to output a first numerical data stream including numerical data the number of which is equal to the third bit length t when a feature of the reception signal is inputted thereto;

converting the first numerical data stream into a second numerical data stream including numerical data the number of which is equal to the second bit length n; and generating a fourth bit stream having the first bit length b by performing, on the second numerical data stream, a conversion processing that corresponds to an inverse conversion of a conversion processing for converting the first bit stream into the second bit stream.

Supplementary Note 20

A recording medium on which a computer program that allows a computer to execute a binary matrix generation method of generating a binary matrix is recorded, wherein the binary matrix generation method includes:

generating q+w (wherein, w is an integer that is equal to or larger than 2) number of first matrixes each of which has one element that is 1 in each column vector and each of which has a size of q (wherein, q is an exponentiation of a prime number) number of row×(q−1) number of column;

generating a second matrix that has q+w number of the first matrixes as elements and that has a size of wq number of row×(q²−1) number of column; and setting, as the binary matrix, a third matrix that is obtained by adding a column vector having w number of elements that are 1 into the second matrix.

The present disclosure is allowed to be changed, if desired, without departing from the essence or spirit of the invention which can be read from the claims and the entire specification, and a communication system, a transmission apparatus, a reception apparatus, a matrix generation apparatus, a communication method, a transmission method, a reception method, a matrix method, a computer program and a recording medium, which involve such changes, are also intended to be within the technical scope of the present disclosure.

DESCRIPTION OF REFERENCE CODES 1 transmission apparatus
11 arithmetic apparatus
111 data conversion unit
112 input layer processing unit
113 Neural Network
2 reception apparatus
21 arithmetic apparatus
212 Neural Network
213 output layer processing unit
214 data conversion unit
SYS communication system
Tx transmission signal
Rx reception signal

What is claimed is:

1. A communication system comprising:
a transmission apparatus that is configured to transmit a transmission signal through a communication line; and
a reception apparatus that is configured to receive, as a reception signal, the transmission signal transmitted by the transmission apparatus through the communication line,
wherein
the transmission apparatus comprises:
at least one first memory configured to store instructions; and
at least one first processor configured to execute the instructions to:
convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
convert the second bit stream into a third bit stream having a third bit length t that is shorter than the second bit stream n; and
generate an index value by using a Neural Network that has an input node the number of which is equal to the third bit length t and that is configured to output the index value designating a feature of the transmission signal when the third bit stream is inputted thereto,
the reception apparatus comprises:
at least one second memory configured to store instructions; and
at least one second processor configured to execute the instructions to:
generate first numerical data by using a Neural Network that has an output node the number of which is equal to the third bit length t and that is configured to output the first numerical data stream including numerical data the number of which is equal to the third bit length t when a feature of the reception signal is inputted thereto;
convert the first numerical data stream into a second numerical data stream including numerical data the number of which is equal to the second bit length n; and
generate a fourth bit stream having the first bit length b by performing, on the second numerical data stream, a conversion processing that corresponds to an inverse conversion of a conversion processing performed for converting the first bit stream into the second bit stream.

2. The communication system according to claim 1, wherein
the at least one first processor is configured to execute the instructions to convert the second bit stream into the third bit stream by using a binary matrix having a size of t number of row×n number of column.

3. The communication system according to claim 2, wherein
the at least one first processor is configured to execute the instructions to designate, based on the bit position of w−1 number of the bit 1 included in the second bit stream, w−1 number of column vector from the binary matrix, and to set t number of component included in a logical OR of w−1 number of the column vector to be the third bit stream.

4. The communication system according to claim 2, wherein
the binary matrix is generated by an extended matrix generation method, the extended matrix generation method includes:
generating a fourth matrix that is a binary matrix having a size of $wq_w$ number of rows×q' (wherein, $q'=q_w^2$) number of column by a matrix generation method, and generating a fifth matrix having a size of q number of row×q' number of column by adding $q-wq_w$ number of row vector in each of which all components are 0 to the fourth matrix, when an exponentiation $q_w$ of the prime number that is equal to or smaller than q/w and that is maximum is equal to or larger than w−1 (wherein, q is an exponentiation of a prime number);
generating a sixth matrix having a size of q number of row×q' number of column by arranging q' (wherein, q' is a maximum integer that is equal to or smaller than (q−1)(w−1)) number of column vector in each of which w number of sequential components are 1 and a residual component is 0 so that the number of a component that is 1 in both of any two column vectors is 1 at most, when the exponentiation $q_w$ is not equal to or larger than w−1; and
setting, as the binary matrix, a seventh matrix that is obtained by adding a block matrix in which w number of fifth matrixes or sixth matrixes are arranged in a diagonal pattern into the third matrix,
the binary matrix generation method includes:
generating q+w number of first matrixes each of which has one component that is 1 in each column vector and each of which has a size of q number of row×(q−1) number of column;
generating a second matrix that has q+w number of the first matrixes as components and that has a size of wq number of row×($q^2$−1) number of column; and
setting, as the binary matrix, a third matrix that is obtained by adding a column vector having w number of components that are 1 into the second matrix.

5. The communication system according to claim 1, wherein
the at least one second processor is configured to execute the instructions to convert the first numerical data stream into the second numerical data stream by using a binary matrix having a size of t number of row×n number of column.

6. The communication system according to claim 4, wherein
the at least one second processor is configured to execute the instructions to calculate a n-dimensional row vector by multiplying the binary matrix with a t-dimensional row vector including t number of numerical data included in the first numerical data stream, and to calculate n number of numerical data that is to be included in the second numerical data stream by dividing each component of the n-dimensional row vector by the number of a component that is 1 in each column vector of the binary matrix.

7. A transmission apparatus that is configured to transmit a transmission signal through a communication line, wherein
the transmission apparatus comprises:
at least one memory configured to store instructions; and
at least one processor configured to execute the instructions to:
convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
convert the second bit stream into a third bit stream having a third bit length t that is shorter than the second bit stream n; and
generate an index value by using a Neural Network that has an input node the number of which is equal to the third bit length t and that is configured to output the index value designating a feature of the transmission signal when the third bit stream is inputted thereto.

8. The transmission apparatus according to claim 7, wherein
the at least one processor is configured to execute the instructions to convert the second bit stream into the third bit stream by using a binary matrix having a size of t number of row×n number of column.

9. The transmission apparatus according to claim 8, wherein
the at least one processor is configured to execute the instructions to designate, based on the bit position of w−1 number of the bit 1 included in the second bit stream, w−1 number of column vector from the binary matrix, and to set t number of component included in a logical OR of w−1 number of the column vector to be the third bit stream.

10. The transmission apparatus according to claim 8, wherein
the binary matrix is a matrix in which the number of a component that is 1 in each column vector is equal to or larger than w and the number of a component that is 1 in both of two column vectors is 1 at most.

11. The transmission apparatus according to claim 8, wherein
the binary matrix is generated by a matrix generation method,
the binary matrix generation method includes:
generating q+w number of first matrixes each of which has one component that is 1 in each column vector and each of which has a size of q (wherein, q is an exponentiation of a prime number) number of row×(q−1) number of column;
generating a second matrix that has q+w number of the first matrixes as components and that has a size of wq number of row×($q^2$−1) number of column; and
setting, as the binary matrix, a third matrix that is obtained by adding a column vector having w number of components that are 1 into the second matrix.

12. A reception apparatus that is configured to receive, as a reception signal, a transmission signal transmitted by a transmission apparatus through a communication line, wherein
the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream,
the reception apparatus comprises:
at least one memory configured to store instructions; and
at least one processor configured to execute the instructions to:
generate first numerical data by using a Neural Network that has an output node the number of which is equal to the third bit length t and that is configured to output the first numerical data stream including numerical data the number of which is equal to the third bit length t when a feature of the reception signal is inputted thereto;

convert the first numerical data stream into a second numerical data stream including numerical data the number of which is equal to the second bit length n; and generate a fourth bit stream having the first bit length b by performing, on the second numerical data stream, a conversion processing that corresponds to an inverse conversion of a conversion processing for converting the first bit stream into the second bit stream.

13. The reception apparatus according to claim 12, wherein
the at least one second processor is configured to execute the instructions to convert the first numerical data stream into the second numerical data stream by using a binary matrix having a size of t number of row×n number of column.

14. The reception apparatus according to claim 13, wherein
the at least one second processor is configured to execute the instructions to calculate a n-dimensional row vector by multiplying the binary matrix with a t-dimensional row vector including t number of numerical data included in the first numerical data stream, and to calculate n number of numerical data that is to be included in the second numerical data stream by dividing each component of the n-dimensional row vector by the number of a component that is 1 in each column vector of the binary matrix.

15. The reception apparatus according to claim 13, wherein
the binary matrix is a matrix in which the number of a component that is 1 in each column vector is equal to or larger than w and the number of a component that is 1 in both of two column vectors is 1 at most.

16. The reception apparatus according to claim 13, wherein
the binary matrix is generated by a matrix generation method,
the binary matrix generation method includes:
generating q+w number of first matrixes each of which has one component that is 1 in each column vector and each of which has a size of q (wherein, q is an exponentiation of a prime number) number of row×(q−1) number of column;
generating a second matrix that has q+w number of the first matrixes as components and that has a size of wq number of row×(q²−1) number of column; and
setting, as the binary matrix, a third matrix that is obtained by adding a column vector having w number of components that are 1 into the second matrix.

17. A non-transitory recording medium on which a computer program that allows a computer to execute a transmission method of transmitting a transmission signal through a communication line is recorded, wherein
the transmission method includes:
converting a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream;
converting the second bit stream into a third bit stream having a third bit length t that is shorter than the second bit stream n; and
generating the transmission signal by using a Neural Network that has an input node the number of which is equal to the third bit length t and that is configured to output an index value designating a feature of the transmission signal when the third bit stream is inputted thereto.

18. A non-transitory recording medium on which a computer program that allows a computer to execute a reception method of receiving, as a reception signal, a transmission signal transmitted by a transmission apparatus through a communication line is recorded, wherein
the transmission apparatus is configured to: convert a first bit stream having a first bit length b into a second bit stream having a second bit length n that is longer than the first bit length b, w−1 (wherein, w is an integer that is equal to or larger than 2) number of bit 1 is assigned at a bit position based on a bit array pattern of the first bit stream in the second bit stream; convert the second bit stream into a third bit stream having a third bit length t that is shorter than the second bit stream n; and generate the transmission signal based on the third bit stream,
the reception method includes:
inputting the reception signal into a Neural Network that has an output node the number of which is equal to the third bit length t and that is configured to output a first numerical data stream including numerical data the number of which is equal to the third bit length t when a feature of the reception signal is inputted thereto;
converting the first numerical data stream into a second numerical data stream including numerical data the number of which is equal to the second bit length n; and
generating a fourth bit stream having the first bit length b by performing, on the second numerical data stream, a conversion processing that corresponds to an inverse conversion of a conversion processing for converting the first bit stream into the second bit stream.

* * * * *